US011369005B2

(12) United States Patent
Abedini et al.

(10) Patent No.: US 11,369,005 B2
(45) Date of Patent: Jun. 21, 2022

(54) IAB TOPOLOGY MANAGEMENT BASED ON SYNCHRONIZATION CAPABILITIES OF IAB-NODE

(71) Applicant: QUALCOMM Incorporated, San Diego, CA (US)

(72) Inventors: Navid Abedini, Basking Ridge, NJ (US); Luca Blessent, Whitehouse Station, NJ (US); Jianghong Luo, Skillman, NJ (US); Karl Georg Hampel, Hoboken, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/159,994

(22) Filed: Jan. 27, 2021

(65) Prior Publication Data

US 2021/0251043 A1    Aug. 12, 2021

Related U.S. Application Data

(60) Provisional application No. 62/970,992, filed on Feb. 6, 2020.

(51) Int. Cl.
*H04W 88/14* (2009.01)
*H04W 64/00* (2009.01)
(Continued)

(52) U.S. Cl.
CPC ............. *H04W 88/14* (2013.01); *H04W 8/24* (2013.01); *H04W 56/001* (2013.01); *H04W 64/003* (2013.01)

(58) Field of Classification Search
CPC ..... H04W 88/14; H04W 8/24; H04W 56/001; H04W 64/003
See application file for complete search history.

(56) References Cited

U.S. PATENT DOCUMENTS

| 2020/0045766 | A1* | 2/2020 | Kim | H04W 36/0005 |
| 2020/0145952 | A1* | 5/2020 | Keskitalo | H04W 56/007 |
| 2021/0058985 | A1* | 2/2021 | Fujishiro | H04W 76/10 |

FOREIGN PATENT DOCUMENTS

| WO | WO-2020008963 A1 * | 1/2020 | H04W 8/00 |
| WO | WO-2020032182 A1 * | 2/2020 | H04L 1/1614 |
| WO | WO-2020168082 A1 * | 8/2020 | H04W 56/00 |

OTHER PUBLICATIONS

3GPP TS 23.501 v15.3.0—3rd Generation Partnership Project; Technical Specification Group Services and System Aspects; System architecture for the 5G System (5GS); Stage 2 (Release 16); Dec. 2019. (Year: 2019).*

(Continued)

*Primary Examiner* — Stephen J Clawson
(74) *Attorney, Agent, or Firm* — ArentFox Schiff LLP

(57) ABSTRACT

An integrated access and backhaul (IAB) central unit may receive, for a first TAB node, at least one of a first indication of a first capability to provide a cell-specific component of a time difference between a distributed unit transmission of a signal from the first IAB node and a reception of the signal at a child node of the first TAB node (T_delta) or a second indication of a second capability to synchronize with a parent node of the first IAB node based on a received T_delta. The central unit may determine the first capability and the second capability of the first IAB node based on at least one of the first indication or the second indication. The central unit may determine a location of the first IAB node within a network topology based on the first capability and the second capability.

30 Claims, 11 Drawing Sheets

(51) Int. Cl.
   *H04W 56/00* (2009.01)
   *H04W 8/24* (2009.01)

(56) References Cited

OTHER PUBLICATIONS

3GPP TS 38.874 v 16.0.0—3rd Generation Partnership Project; Technical Specification Group Services and System Aspects; NR; Study on Integrated Access and Backhaul (Release 16); Dec. 2018. (Year: 2018).*

3GPP TSG-RAN WG2#102; Busan, Republic of Korea; May 21-25, 2018; R2-1806817; Ericsson; Setup procedures for IAB-node and a UE connected to an IAB node. (Year: 2018).*

\* cited by examiner

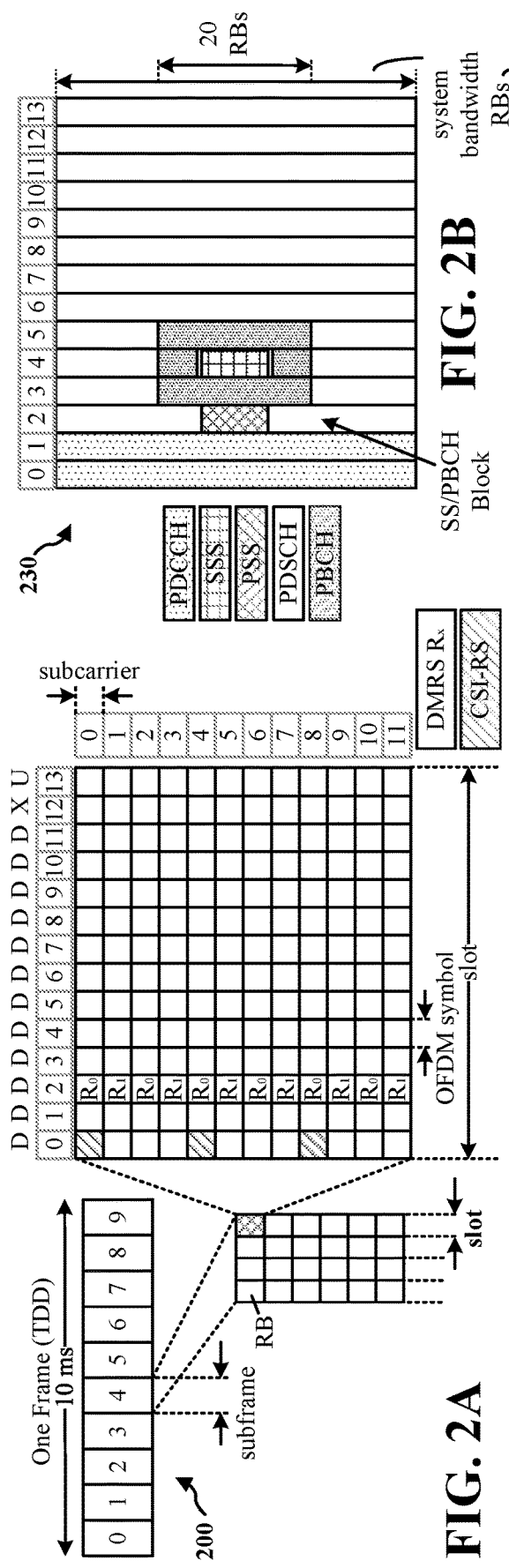
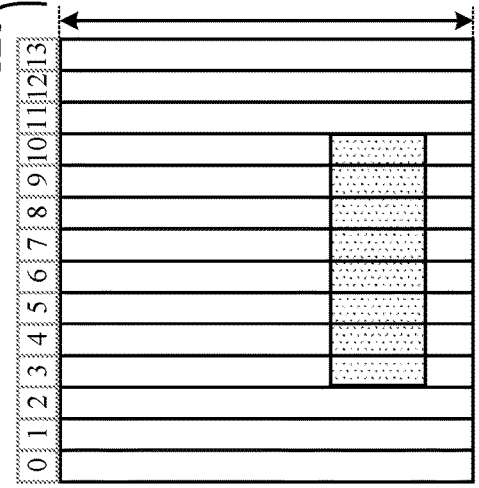
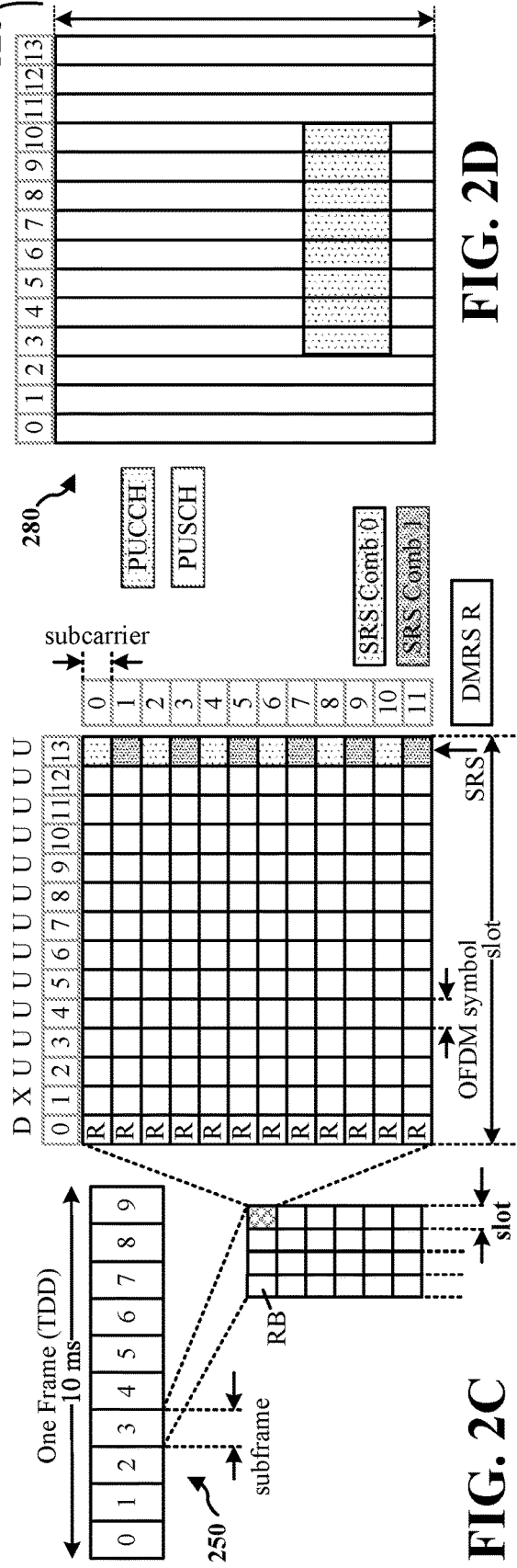

IAB TOPOLOGY MANAGEMENT BASED ON SYNCHRONIZATION CAPABILITIES OF IAB-NODE

CROSS REFERENCE TO RELATED APPLICATIONS

This application claims priority to U.S. Provisional Application No. 62/970,992 titled "IAB TOPOLOGY MANAGEMENT BASED ON SYNCHRONIZATION CAPABILITIES OF IAB-NODE," filed Feb. 6, 2020, which is assigned to the assignee hereof, and incorporated herein by reference in its entirety.

BACKGROUND

Technical Field

The present disclosure relates generally to communication systems, and more particularly, to apparatus and methods of managing a network topology including integrated access and backhaul (IAB) nodes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure provides a method, apparatus, and non-transitory computer readable medium for determining a location of an integrated access and backhaul (IAB) node. The method may include receiving a first indication, a second indication, or both. The first indication indicates a first capability of a first integrated access and backhaul (IAB) node to provide a T_delta to a child node of the first IAB node to enable the child node of the first IAB node to synchronize with the first IAB node. The second indication indicates a second capability of the first IAB node to synchronize with a parent node of the first IAB node based on a T_delta received by the first IAB node. T_delta refers to a cell-specific component of a time difference between a distributed unit transmission of a signal from the first IAB node and a reception of the signal at the child node of the first IAB node. The method may include determining a positive result or a negative result for each of the first capability and the second capability based on the first indication, the second indication, or both, wherein the determining comprises determining a negative result when no indication is received. The method may include determining a location of the first IAB node within a network topology based on the first capability and the second capability.

The disclosure also provides an apparatus (e.g., a base station) including a memory storing computer-executable instructions and at least one processor configured to execute the computer-executable instructions to perform the above method, an apparatus including means for performing the above method, and a computer-readable medium storing computer-executable instructions for performing the above method.

In another aspect, the present disclosure provides a method, apparatus, and non-transitory computer readable medium for synchronizing an IAB node. The method may include transmitting, from a first integrated access and backhaul (IAB) node to second node, a first indication, a second indication, or both. The first indication indicates a first capability of the first IAB node to provide a T_delta to a child node of the first IAB node. The second indication indicates a second capability of the first IAB node to synchronize with a parent node based on a T_delta received by the first IAB node. T_delta refers to a cell-specific component of a time difference between a distributed unit transmission of a signal from the first IAB node and a reception of the signal at the child node of the first IAB node. The method may include determining a location of the first IAB node within a network topology based on the first capability and the second capability. The method may include synchronizing the first IAB node with at least one of a parent node or a child node over-the-air based on the location of the first IAB node.

The disclosure also provides an apparatus (e.g., a base station) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame.

FIG. 2B is a diagram illustrating an example of DL channels within a 5G/NR subframe.

FIG. 2C is a diagram illustrating an example of a second 5G/NR frame.

FIG. 2D is a diagram illustrating an example of UL channels within a 5G/NR subframe.

DETAILED DESCRIPTION

Figure 1:
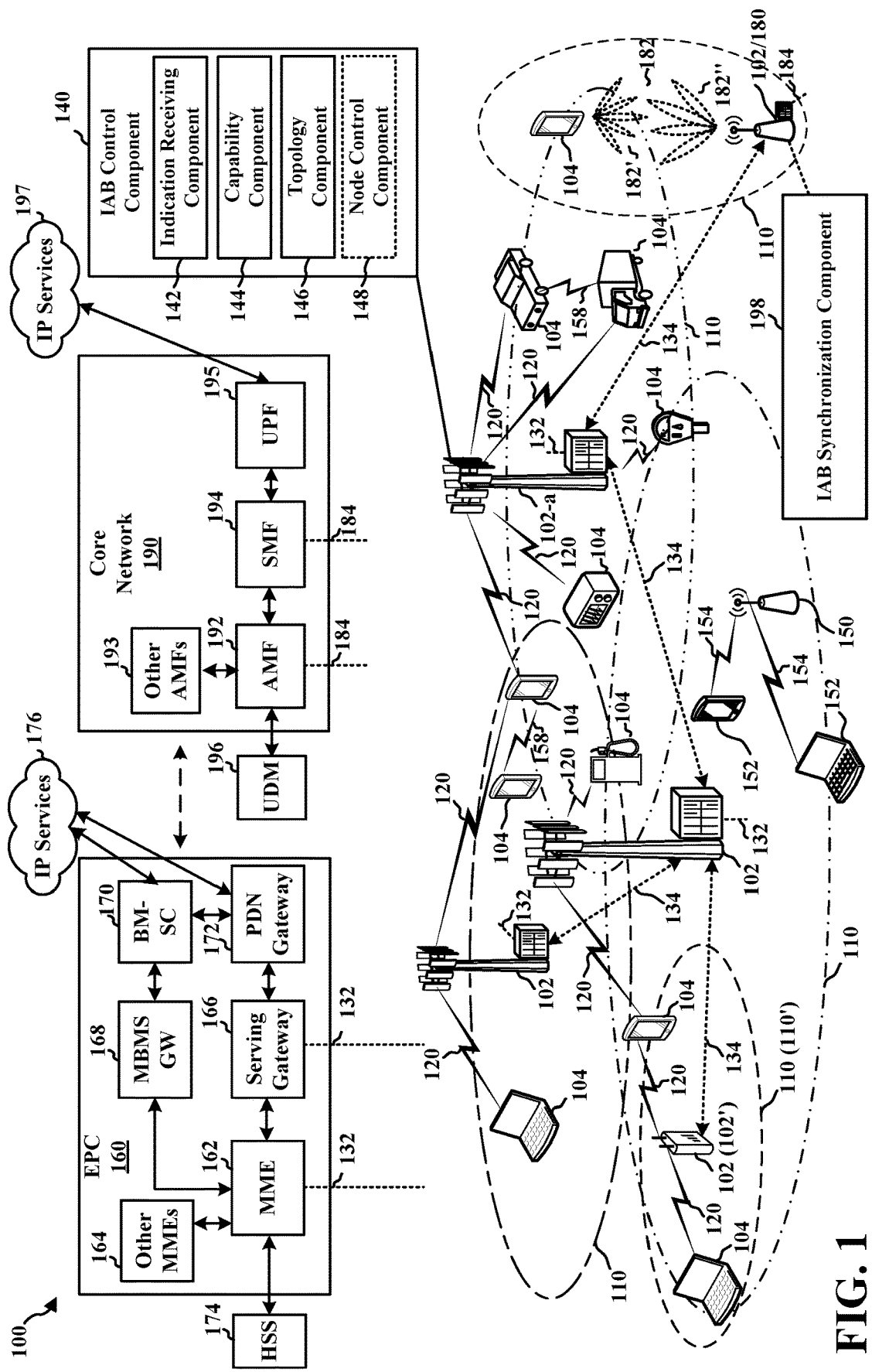
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

An integrated access and backhaul (IAB) network may optionally utilize over-the-air (OTA) synchronization to synchronize downlink transmissions from different IAB nodes. The IAB network may include a mix of IAB nodes that are capable of OTA synchronization and those that cannot perform one or more aspects of OTA synchronization. For example, an IAB node may be able to perform OTA synchronization with a parent node, but not a child node, or vice versa. In another aspect, an IAB node may have an alternative synchronization source such as global navigational satellite system (GNSS) or an Ethernet connection.

In an aspect, the present disclosure provides for generating and modifying a network topology based on the synchronization capabilities of IAB nodes. A capability may indicate an ability of an IAB node to perform a type of synchronization. The topology may be generated by a central unit (CU) or may be generated in a distributed manner at the CU and one or more IAB nodes. For example, the CU or an IAB node may receive an indication of capabilities of a first IAB node, determine the capabilities of the first IAB node, and determine a location of the first IAB node within the network topology based on the capabilities of the first IAB node. More specifically, the capabilities may include a first capability to provide a cell-specific component of a time difference between a distributed unit transmission of a signal from the first IAB node and a reception of the signal at a child node of the first IAB node (T_delta) to a child node for the child node to synchronize with the first IAB node and a second capability to synchronize with a parent node of the first IAB node based on a received T_delta.

In another aspect, a first IAB node may transmit to a second node, the first capability and the second capability. For example, the second node may be the CU or another IAB node. The first IAB node may determine the location of the first IAB node within the network topology based on the first capability and the second capability. For example, the first IAB node may receive the location from the second node. The first IAB node may synchronize with at least one of a parent node or a child node over-the-air based on the location of the first IAB node.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 106, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

In an aspect, one or more of the base stations 102 may be an IAB node. For example, the base station 102/180 may be an IAB node and may communicate with another base station (e.g., base station 102-*a*) via a wireless third backhaul link 134. The base station 102-*a* may also be an IAB node or may be a central unit (CU) having a first backhaul link 132. The base station 102-*a* may include an IAB control component 140 that determines a location of another IAB node (e.g., base station 102/180) within a network topology based on synchronization capabilities of the other IAB node. For example, the IAB control component 140 may include a receiving component 142 that receives, a first indication, a second indication, or both. The first indication indicates a first capability of the first IAB node to provide a T_delta to a child node of the first IAB node to enable the child node of the first IAB node to synchronize with the first IAB node. The second indication indicates a second capability of the first IAB node to synchronize with a parent node of the first IAB node based on a T_delta received by the first IAB node. T_delta refers to a cell-specific component of a time difference between a distributed unit transmission of a signal from the first IAB node and a reception of the signal at the child node of the first IAB node. The IAB control component 140 may include a capability component 144 that determines a positive result or a negative result for each of the first capability and the second capability based on the first indication, the second indication, or both. Each of the first indication and the second indication may be positive or negative. The capability component 144 may determine a negative result when no indication is received. The IAB control component 140 may include a topology component 146 that determines a location of the first IAB node within a network topology based on the first capability and the second capability. The IAB control component 140 may optionally include a node control component 148 that provides the location to the first IAB node or provides commands to one or more IAB nodes to perform handovers based on the network topology.

Figure 6:
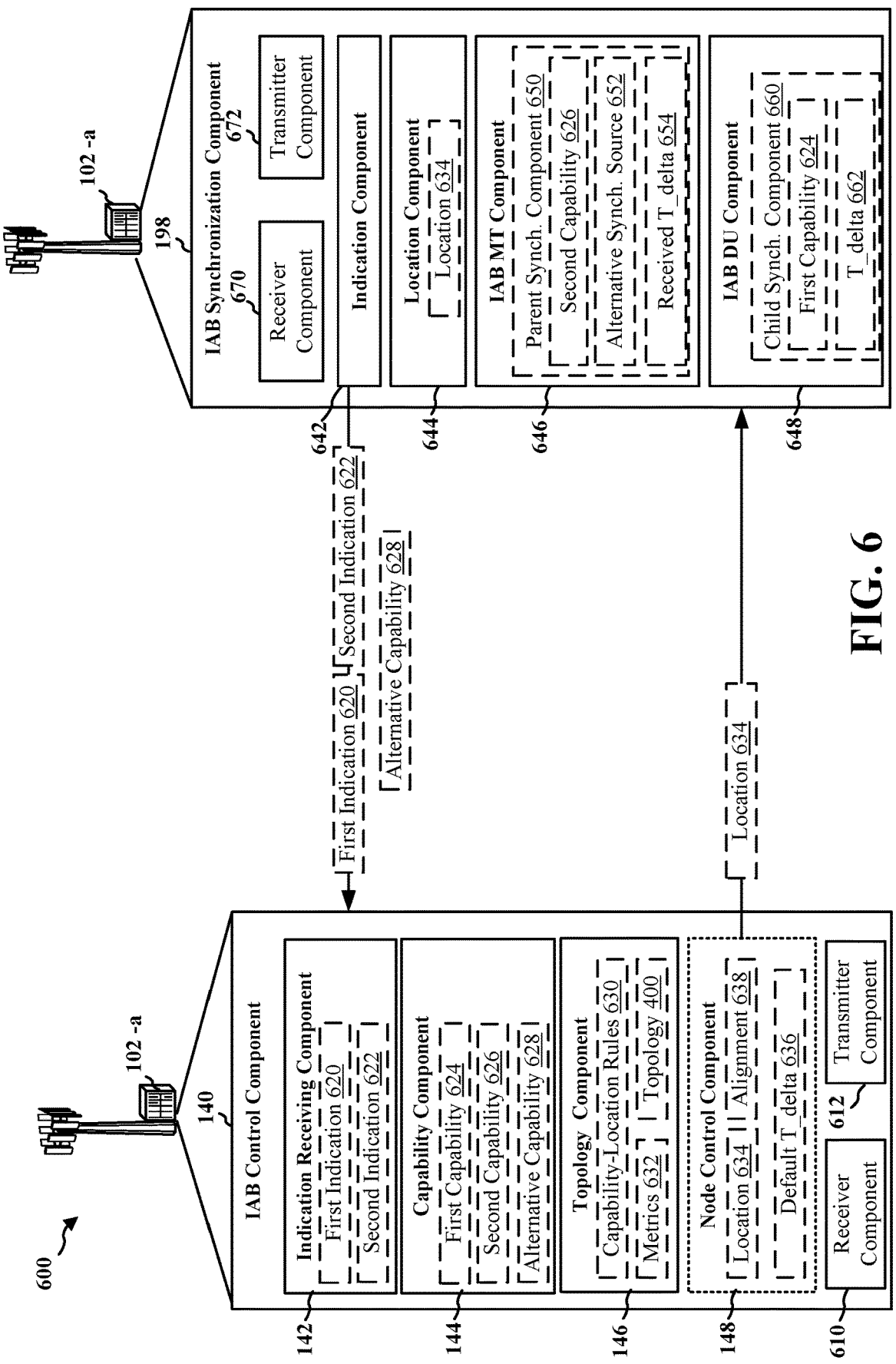
FIG. 6 is a diagram illustrating example communications and components of two base stations.
Figure 8:
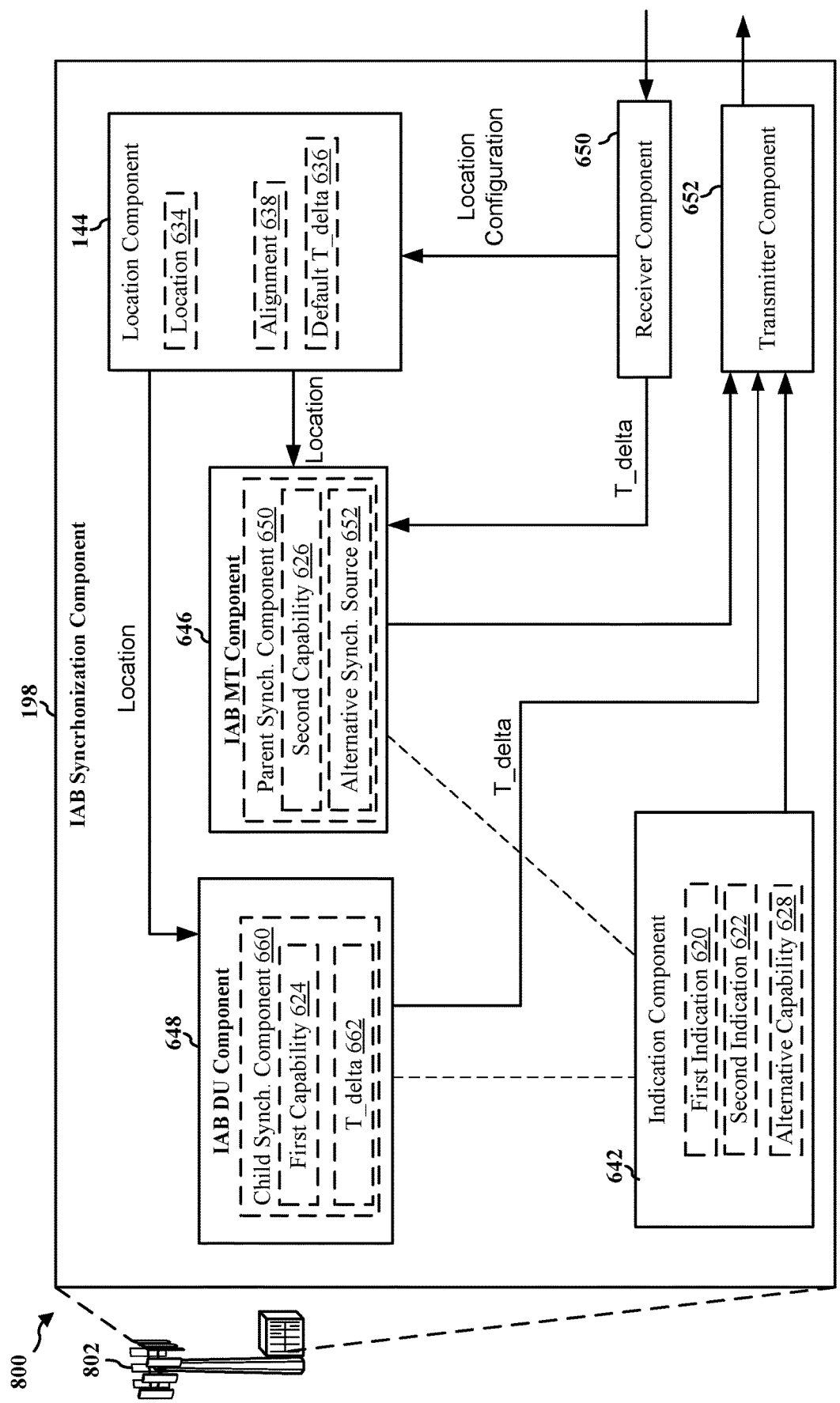
FIG. 8 is a conceptual data flow diagram illustrating the data flow between different means/components in an example base station including an IAB capability component.

The base station 102/180 may include an IAB synchronization component 198 that indicates capabilities of the IAB node and synchronizes with parent and/or child nodes based on a location within a network topology. The location of the IAB node may define one or more parent nodes and one or more child nodes for an IAB node. As illustrated in FIGS. 6 and 8, the IAB synchronization component 198 may include an indication component 642 that transmits, from a first IAB node to second node, a first indication, a second indication, or both. The first indication indicates a first capability of the first IAB node to provide a T_delta to a child node of the first IAB node. The second indication indicates a second capability of the first IAB node to synchronize with a parent node based on a T_delta received by the first IAB node. T_delta refers to a cell-specific component of a time difference between a distributed unit transmission of a signal from the first IAB node and a reception of the signal at the child node of the first IAB node. The IAB synchronization component 198 may include a location component 644 that determines a location of the IAB node within a network topology based on the first capability and the second capability. The IAB synchronization component 198 may also include an IAB MT component 646 that communicates with a parent node and an IAB DU component 648 that communicates with a child node to synchronize the first IAB node with at least one of a parent node or a child node over-the-air based on the location of the first IAB node.

In an aspect, a base station may include both the IAB control component 140 and the IAB synchronization component 198. Such a base station may participate in generating the network topology in a distributed or an ad hoc manner. For example, in an implementation, a base station including the IAB control component 140 and the IAB synchronization component 198 may select the parent and child nodes for the base station based on the capabilities of the base station and capabilities of other IAB nodes.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be time divisional duplexed (TDD), with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative acknowledgement (NACK) feedback. The PUSCH carries data, and may additionally be used to carry a buffer status report (BSR), a power headroom report (PHR), and/or UCI.

Figure 3:
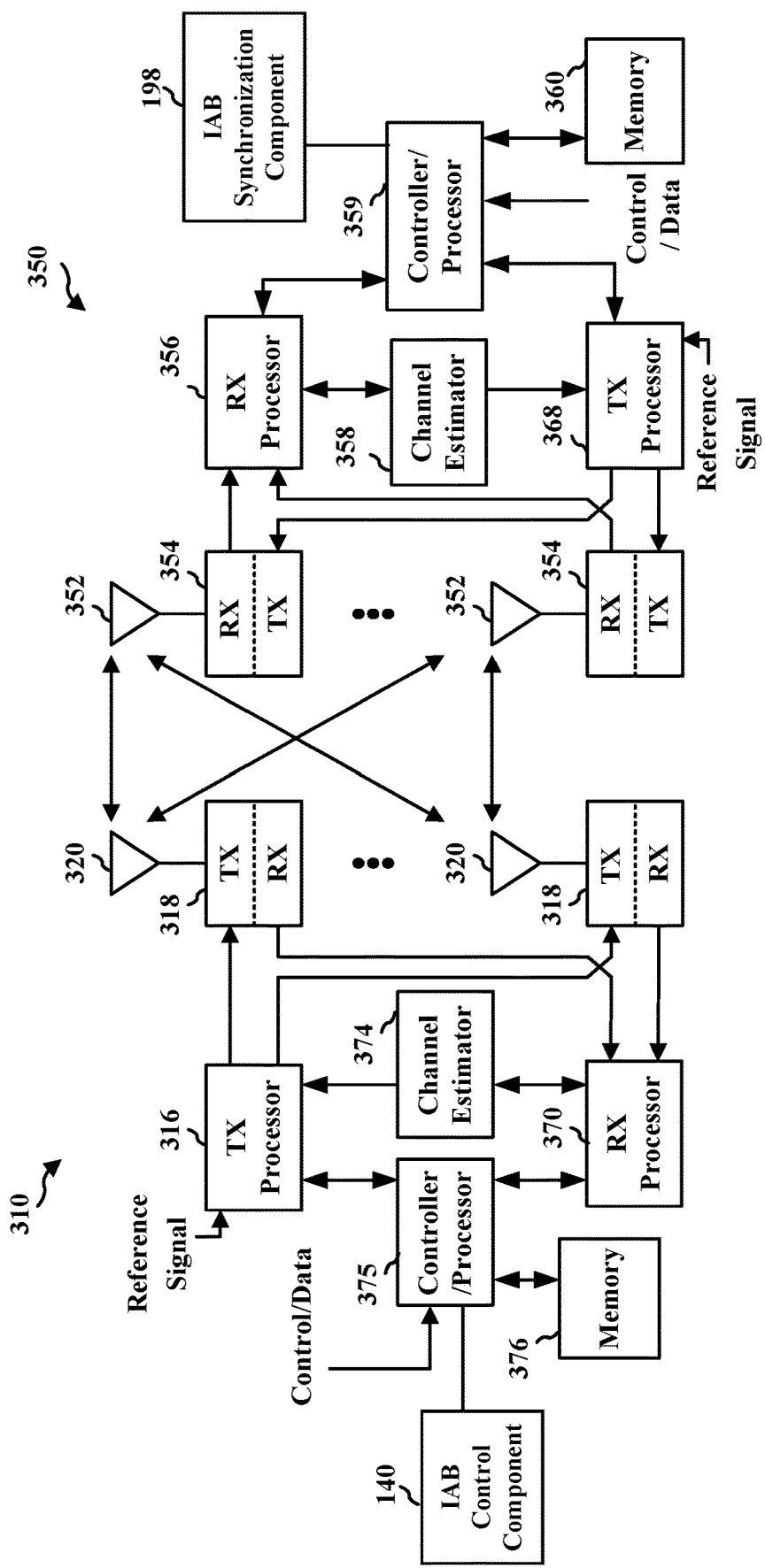
FIG. 3 is a diagram illustrating an example of a base station and user equipment (UE) in an access network.

FIG. 3 is a block diagram of a parent IAB node 310 in communication with a child IAB node 350 in an IAB network. In an IAB network, the procedures for communication between a base station and a UE may be reused for a third backhaul links 134 between IAB nodes. For example, the parent IAB node 310 may perform the actions of a base station in an access network and a child IAB node 350 may perform the actions of a UE in an access network to implement a wireless third backhaul link 134.

In the DL, IP packets from the EPC 160 or core network 190 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the child IAB node 350. Each spatial stream may then be provided to a different antenna 320 via a separate transmitter 318TX. Each transmitter 318TX may modulate an RF carrier with a respective spatial stream for transmission.

At the child IAB node 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the child IAB node 350. If multiple spatial streams are destined for the child IAB node 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the parent IAB node 310. These soft decisions may be based on channel estimates computed by the channel estimator 358. The soft decisions are then decoded and deinterleaved to recover the data and control signals that were originally transmitted by the parent IAB node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the parent IAB node 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the parent IAB node 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the parent IAB node 310 in a manner similar to that described in connection with the receiver function at the child IAB node 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the child IAB node 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the IAB control component 140 of FIG. 1. Further, at least one of the TX processor 368, the RX processor 356, and the controller/processor 359 may be configured to perform aspects in connection with the IAB synchronization component 198 (e.g., synchronizing with a child node).

At least one of the TX processor 316, the RX processor 370, and the controller/processor 375 may be configured to perform aspects in connection with the IAB synchronization component 198 of FIG. 1.

Figure 4:
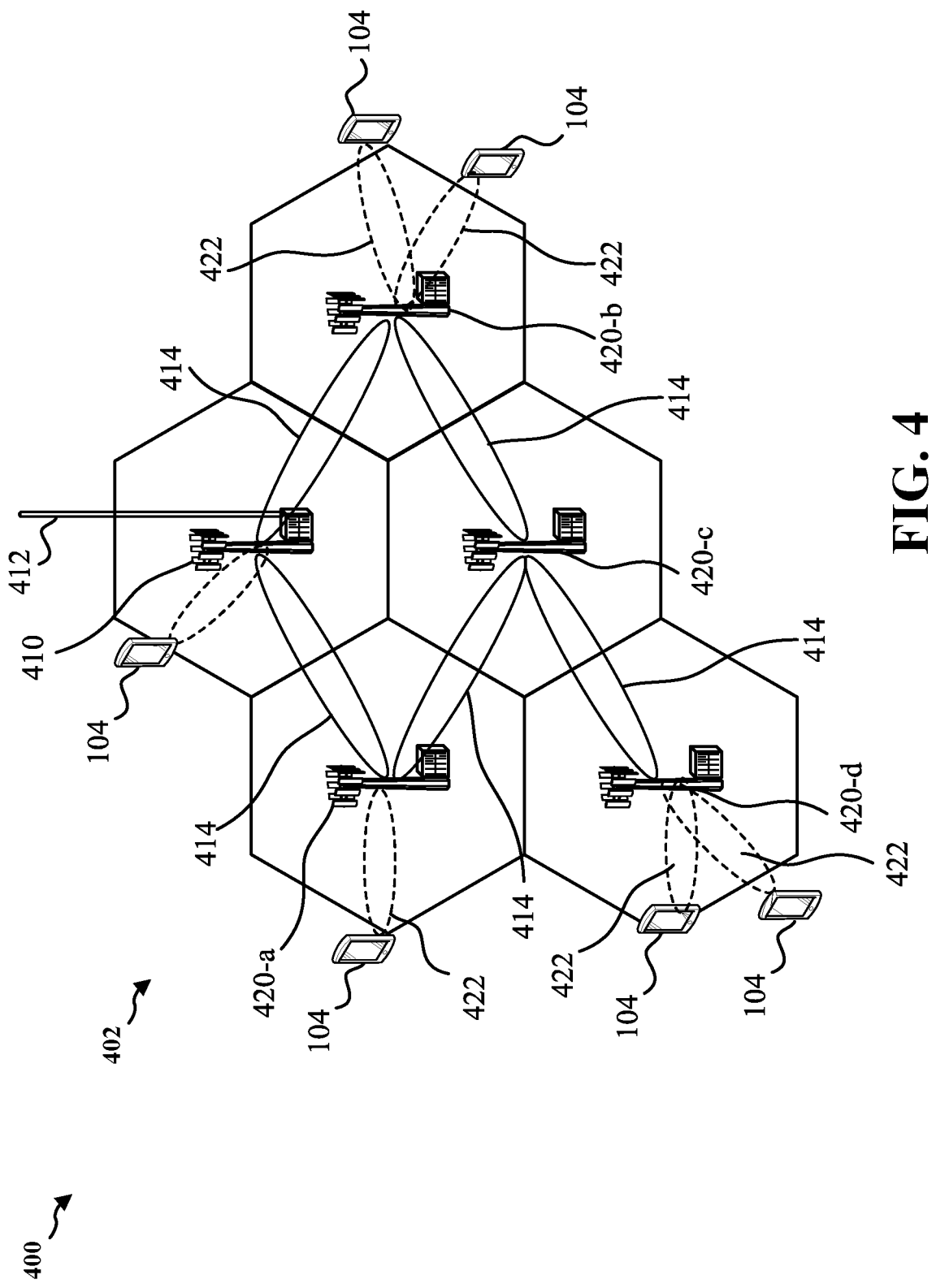
FIG. 4 is a diagram of an example IAB network topology.

Referring to FIG. 4, an example of a network topology 400 for a wireless backhaul network 402 such as an IAB network that includes a donor node 410 and several relay nodes 420 providing access to UEs 104. Wireless backhauls 414 can provide range extension to a wireline backhaul 412 or fronthaul. A wireless backhaul network 402 may support multiple backhaul hops as well as redundant connectivity, e.g. by providing multiple paths between a donor node 410 (e.g., a CU) and a relay node 420 (e.g., one of relay nodes 420-a, 420-b, 420-c, or 420-d acting as a parent IAB node 310 and/or a child IAB node 350). In this context, the donor node 410 provides the interface between the wireless network and the wireline network (e.g., 5G core network 190 (FIG. 1)).

In an IAB network, the donor node 410 may act as a CU, and each of the relay nodes 420 may act as a distributed unit (DU). Each of the relay nodes 420 may be referred to as an IAB node. A network topology 400 may include one or more parent nodes and one or more child nodes for each IAB node that define a location within the network topology 400. For example, a first relay node 420 may be a parent node to second relay node 420 and a child node to a third relay node 420. Child nodes may include UEs 104, which may be connected to a parent IAB node via an access link 422. For example, the location for the relay node 420-b may include the donor node 410 as a parent node, the relay node 420-c as a child node, and the UEs 104 as child nodes. As another example, the relay node 420-c may have two parent nodes, relay nodes 420-a and 420-b, and one child node 420-d.

In an aspect, a parent node may synchronize with a child node using an over-the-air (OTA) synchronization mechanism. All of the IAB nodes may be synchronized in a distributed and/or an ad-hoc manner. One benefit of OTA synchronization is simplicity, as OTA synchronization relies on signals transmitted by the nodes over the air. Accordingly OTA synchronization may remove reliance on other synchronization sources such as GNSS/GPS or Ethernet, which may not always be available, or may be costly to deploy and maintain.

Each IAB node may include a mobile terminal (MT) portion (IAB-MT) that communicates with a parent node and a distributed unit (DU) portion (IAB-DU) that communicates with a child node. Each IAB-MT synchronizes with the parent node(s) of the IAB node following a synchronization procedure for UEs. The IAB-DU may provide a synchronization source for the next hop, following the same procedure as an access network. For example, the IAB-DU may transmit synchronization signals, estimate uplink synchronization, and provide a timing advance command to compensate for propagation delay. In an IAB network, each IAB node may have a different total time difference between an IAB-DU transmission of a signal from the IAB node and a reception of the signal at a child IAB node. A cell-specific component of the total time difference may be referred to as T_delta. By providing the T_delta to a child IAB node, the IAB node may synchronize downlink transmissions with the rest of the IAB network.

Figure 5:
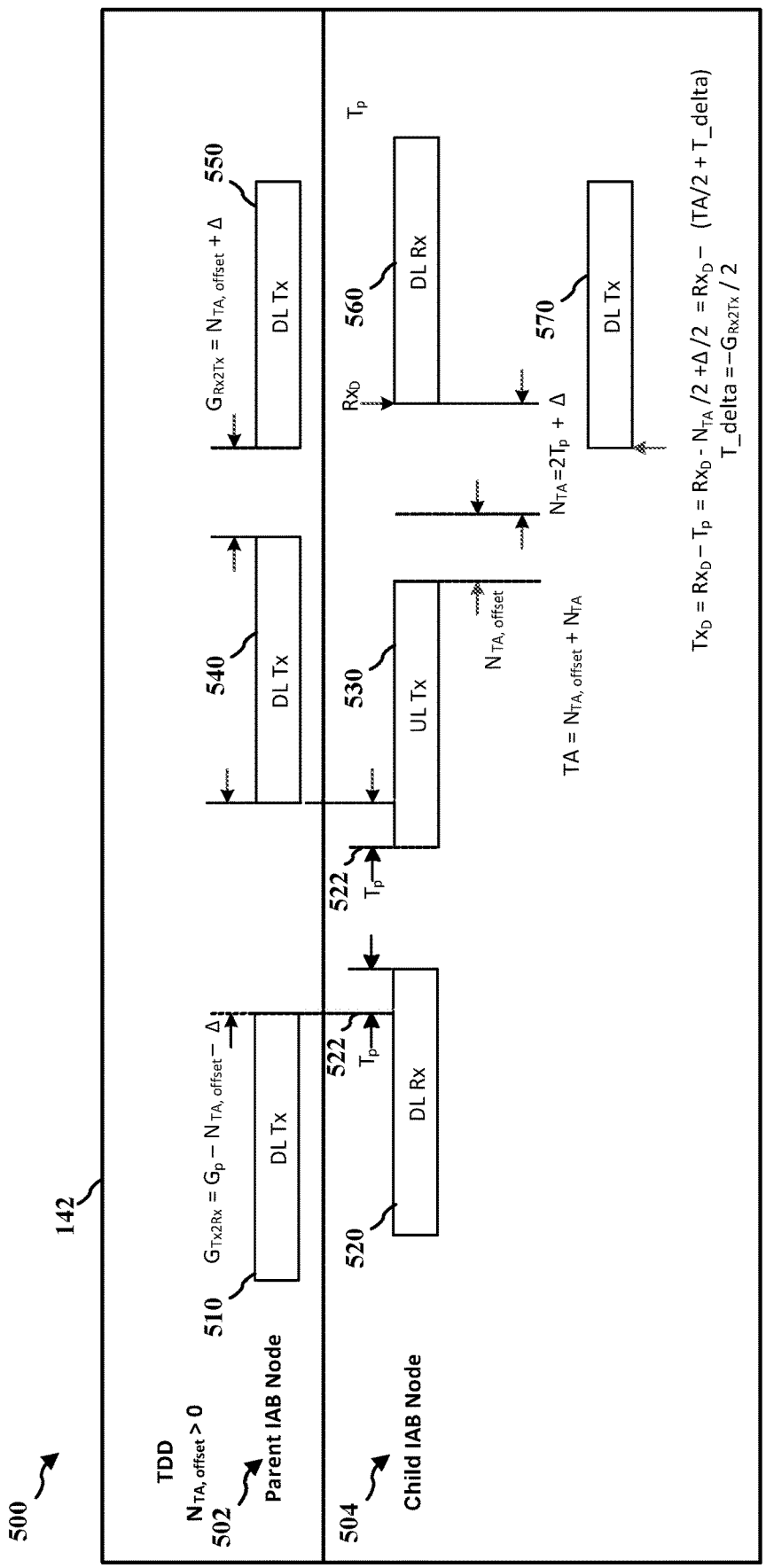
FIG. 5 is a diagram of an example timing diagram for synchronization between a parent IAB node and a child IAB node based on a cell-specific component of a timing difference.

FIG. 5 is a timing diagram 500 illustrating an example of synchronization utilizing a T_delta. Unless otherwise noted, time values are illustrated and discussed in units of $T_c$, as defined in Technical Specification (TS) 38.211, where $T_c=1/(\Delta f_{max} \cdot N_f)$ and where $\Delta f_{max}=480 \cdot 10^3$ and $N_f=4096$. A parent IAB node 502 may transmit a downlink transmission (DL Tx) 510 that is synchronized with the IAB network based on a gap between transmission and reception $(G_{Tx2Rx})$=Gp−$N_{TA,offset}$−$\Delta$. Gp may refer to a configured guard period between DL and UL, $N_{TA,offset}$ may refer to a network timing advance offset, and $\Delta$ may refer to a cell specific component of the timing difference. The child IAB node 504 may receive the DL Tx 510 as downlink reception (DL Rx) 520. The DL Rx 520 may have a propagation delay $(T_p)$ 522. The child IAB node 504 may transmit an uplink transmission (UL Tx) 530, which the parent IAB node 502 may receive as uplink reception (UL Rx) 540. The parent IAB node 502 may receive the UL Tx 530 as the UL Rx 540 with another propagation delay $(T_p)$ 522. Additionally, the UL Tx 530 may indicate a timing advance (TA), which may be equal to a network timing advance offset $(N_{TA,offset})$ plus a network timing advance $(N_{TA})$. The $N_{TA}$ may be equal to two times the $T_p$ plus the cell-specific component $(\Delta)$. The parent IAB node 502 may determine the T_delta based on the formula:

T_delta=−$G_{Rx2Tx}$/2, where $G_{Rx2Tx}$ is a gap between reception and transmission. The parent IAB node 502 may transmit the T_delta to the child IAB node 504 with DL Tx 550. The child IAB node 504 may receive the T_delta from the parent IAB node. The child IAB node 504 may set its DL Tx timing (e.g., for DL Tx 570) ahead of its DL Rx timing (e.g., for DL Rx 560) by TA/2+T_delta. If an IAB-node is provided a value T_delta from a serving cell, the IAB-node may assume that $(N_{TA}+N_{TA,offset}) \cdot T_c/2$+T_delta is a time difference between a DU transmission of a signal from the serving cell providing the T_delta and a reception of the signal at the IAB-MT when $(N_{TA}+N_{TA,offset}) \cdot T_c/2$+T_delta>0, where $N_{TA}$ and $N_{TA,offset}$ are obtained in the same manner as in UE synchronization. The allowable range of values of T_delta may vary based on sub-carrier spacing (SCS) given in Table 1:

TABLE 1

| SCS [kHz] | Max T_delta [$T_c$] | Min T_delta [$T_c$] |
|---|---|---|
| 15 | −N_TAoffset/2 + 6256 | −N_TAoffset/2 − 70528 |
| 30 | −N_TAoffset/2 + 6128 | −N_TAoffset/2 − 35328 |
| 60 | −N_TAoffset/2 + 6032 | −N_TAoffset/2 − 17664 |
| 120 | −N_TAoffset/2 + 6032 | −N_TAoffset/2 − 8816 |

In an aspect, support for OTA synchronization based on T_delta may be optional. For a network deployment, some IAB nodes may support OTA synchronization based on T_delta, while others may not. Further, a node may support OTA synchronization based on T_delta as a parent node, but not as a child node (or vice versa). Additionally, an IAB node may or may not have access to an alternative synchronization source, or an alternative synchronization source may be temporarily unavailable. In an aspect, the present disclosure provides techniques for determining and implementing a network topology 400 based on the capability of one or more IAB nodes for OTA synchronization.

FIG. 6 is a diagram 600 illustrating example communications and components of two base stations 102-*a* and 102-*b*. For illustrative purposes, the base station 102-*a* includes the IAB control component 140 and the base station 102-*b* includes the IAB synchronization component 198. As mentioned above, however, a base station 102 may include both the IAB control component 140 and the IAB synchronization component 198.

The base station 102 and/or the IAB synchronization component 198 may include a receiver component 670, which may include, for example, a radio frequency (RF) receiver for receiving the signals described herein. The base station 102 may include a transmitter component 672, which may include, for example, an RF transmitter for transmitting the signals described herein. In an aspect, the receiver component 670 and the transmitter component 672 may be implemented as a transceiver.

As discussed briefly above with respect to FIG. 1, the IAB synchronization component 198 may include an indication component 642 that transmits a first indication 620 and/or a second indication 622 to another node (e.g., the base station 102-*a*, which may be a CU or another IAB node). The first indication 620 may indicate a first capability 624 to provide T_delta 636 to a child node for the child node to synchronize with the base station 102-*b*. The first capability 624 may be a property of the IAB DU component 648. That is, the first capability 624 may indicate whether the IAB DU component 648 is capable of performing OTA synchronization by sending T_delta 662 to a child node. The second indication 622 may indicate a second capability 626 to synchronize with a parent node of the first IAB node based on a received T_delta 654 that is received from the parent node. The second capability 626 may be a property of the IAB MT component 646. That is, the second capability 626 may indicate whether the IAB MT component 646 is capable of synchronizing with a parent node based on a received T_delta 654. In an aspect, the first indication 620 and/or the second indication 622 may specify either a positive capability or a negative capability. In an aspect, when either the IAB DU component 648 lacks the first capability 624 or the IAB MT component 646 lacks the second capability 626, the indication component 642 may not signal a respective indication.

The IAB synchronization component 198 may include a location component 644 that determines a location 634 of the base station 102-*b* within a network topology 400. The location 634 may indicate one or more parent nodes for the base station 102-*b* and one or more child nodes of the base station 102-*b*. The parent nodes and the child nodes included in the location component 644 may be nodes that the base station 102-*b* is able to synchronize with based on the first capability 624 and the second capability 626. In an aspect, the location component 644 may receive the location 634 from the base station 102-*a*. In another aspect, where the base station 102-*b* also includes an IAB control component 140, the location component 644 may receive the location 634 from the co-located IAB control component.

The IAB MT component 646 may communicate with a parent node. For example, the IAB MT component 646 may perform the actions of child IAB node 350 discussed above with respect to FIG. 3 for communicating with another base station 102 via a wireless backhaul (e.g., third backhaul 134). In particular, the IAB MT component 646 may include a parent synchronization component 650 that synchronizes the IAB MT component 646 with a parent node. If the second capability 626 is positive, the parent synchronization component 650 may receive the T_delta 654 from the parent node and synchronize with the parent node as described above with respect to FIG. 4. In an aspect, the parent synchronization component 650 may include an alternative synchronization source 652. For example, the alternative synchronization source 652 may be a GNSS (e.g., global positioning system (GPS)) receiver or an Ethernet connection. When the parent synchronization component 650 has a positive second capability 626 and an alternative synchronization source 652, the parent synchronization component 650 may select between the available synchronization sources. For instance, a GNSS synchronization source may not be available indoors, so the parent synchronization component 650 may select OTA synchronization. The parent synchronization component 650 may utilize a threshold for a metric of the OTA synchronization or the alternative synchronization source 652 (e.g., received signal strength) to select the synchronization source. The parent synchronization component 650 may also be configured with a time threshold for selecting the synchronization source to prevent repeated changes of synchronization source.

In an aspect, the IAB MT component 646 may receive a default T_delta 636 from a CU or a parent node. The default T_delta 636 provides an approximation of a timing difference before an actual timing difference can be measured. In one example, the default value may be a fixed or preconfigured value indicated, for example, by system information, a standards document, or a regulation. In an example, the default T_delta value depends on the subcarrier spacing, SCS, or depends on the subcarrier frequency, or both. In an example, the dependency of the default T_delta value on SCS or subcarrier frequency, or both, may be determinable based on a look-up table. In one example, the default T_delta value could depend upon whether the subcarrier frequency is in FR1 (defined in TS 38.101 as 410 MHz-7125 MHz) or in FR2 (defined in TS 38.101 as 24250 MHz-52600 MHz) such that one default T_delta value corresponds to FR1 and a different default T_delta value corresponds to FR2. As an example use of the default T_delta 636, when the base station 102-b determines to change from a current parent node to a second parent node (e.g., based on a change to location 634), the parent synchronization component 650 may synchronize with the second parent node based on the default T_delta 636. Later, when the parent synchronization component 650 determines a second value of T_delta for the second parent node based on a transmission from the second parent node, the parent synchronization component 650 may synchronize the base station 102-b with the second parent node based on the second value of T_delta.

The IAB DU component 648 may communicate with a child node, which may include another base station or a UE 104. The IAB DU component 648 may perform the actions of UE 310 discussed above with respect to FIG. 3 for communicating with the child node. The IAB DU component 648 may include a child synchronization component 660 for synchronizing with the child node. For example, if the first capability 624 is positive, the child synchronization component 660 may determine the T_delta 636 and transmit the T_delta 636 to the child node as described above with respect to FIG. 4. If the first capability is negative, the base station 102-b may only have UEs 104 as child nodes, which do not use OTA synchronization for downlink signals.

The base station 102-a may include a receiver component 610, which may include, for example, a RF receiver for receiving the signals described herein. The base station 102-a may include a transmitter component 612, which may include, for example, an RF transmitter for transmitting the signals described herein. In an aspect, the receiver component 610 and the transmitter component 612 may be implemented as a transceiver.

As discussed above regarding FIG. 1, the base station 102-a may include the IAB control component 140 including the indication receiving component 142, the capability component 144, the topology component 146, and the node control component 148.

The indication receiving component 142 may receive the first indication 620, the second indication 622, or both from the base station 102-b, the IAB synchronization component 198, or the indication component 642, via the receiver component 610. The first indication 620 and the second indication 622 may indicate the first capability 624 and the second capability 626, respectively. Each of the first indication 620 and the second indication 622 may be positive or negative. The indication receiving component 142 may also receive an indication of an alternative capability 628, which may identify the alternative synchronization source 652.

The capability component 144 may determine a positive result or a negative result for each of the first capability 624 and the second capability 626 of the base station 102-b based on the first indication 620 and the second indication 622. When the capability component 144 receives the first indication 620 and the second indication 622, the capability component 144 may determine the result to be as indicated. If either the first indication 620 or the second indication 622 is not received, the capability component 144 may determine that the result corresponding to the missing indication is a negative result. The capability component 144 may determine a type of alternative synchronization source indicated by the alternative capability 628.

The topology component 146 may determine the location 634 of the base station 102-b within a network topology 400 based on the first capability 624 and the second capability 626. The topology component 146 may optionally determine the location 634 based on an alternative capability 628. In an aspect, the topology component 146 may be configured with capability-location rules 630 that can be used to determine allowable locations, allowable parent nodes, or allowable child nodes for an IAB node. For example, the capability-location rules 630 may allow a location where the IAB node is capable of synchronizing with at least one parent node and each child IAB node. For instance, the capability-location rules 630 may specify selecting, in response to determining the positive result for the first capability 624, the first IAB node as a parent node of a second IAB node that has a capability (e.g., second capability 626) to synchronize with a parent node based on a T_delta. The capability-location rules 630 may specify selecting at least one UE 104 as a child node of the first IAB node in response to determining the negative result for the first capability 624. The capability-location rules 630 may specify selecting the first IAB node as a parent node of a second IAB node that indicates an alternative capability 628, in response to determining the negative result for the first capability 624. The capability-location rules 630 may specify selecting, in response to determining the positive result for the first capability 624, a second IAB node that has a capability (e.g., second capability 626) to synchronize with a parent node based on the T_delta as a child node of the first IAB node. The capability-location rules 630 may specify excluding the first IAB node from the network topology 400 based on determining the negative result for at least one of the first capability 624 or the second capability 626.

In an aspect, the topology component 146 may include metrics 632, which may be used to select between allowable locations and/or synchronization sources. For example, the metrics 632 may include link quality, throughput, and load for each IAB node. When a first IAB node supports an alternative synchronization source 652, the topology component 146 may select one of the alternative synchronization source 652 and a parent IAB node 502 as a synchronization source for the IAB node.

The topology component 146 may modify the network topology 400 and/or a location 634 of an IAB node (e.g., the base station 102-b). For example, the topology component 146 may receive an indication of a new IAB node including a third indication of a capability of the new IAB node to provide a T_delta and a fourth indication of a capability of the new IAB node to synchronize based on a T_delta. The third indication and the fourth indication may correspond to the first indication 620 and the second indication 622, respectively, except for the new IAB node. The topology component 146 may modify the network topology 400 to include the new IAB node based on the first capability, the second capability, the third indication, and the fourth indication. As another example, the topology component 146 may receive an indication that the synchronization source for the first IAB node has changed. The topology component 146 may modify the network topology 400 to include a new parent node for the first IAB node based on the other of the alternative synchronization source and the parent IAB node.

The IAB control component 140 may include a node control component 148 that implements various aspects of the topology 400. For example, the node control component 148 may transmit the location 634 to each IAB node (e.g., the base station 102-*b*). In an aspect, where the IAB node utilizes an alternative synchronization source 652, the node control component 148 may determine an alignment 638 between OTA synchronization and the alternative synchronization source 652. The node control component 148 may transmit the alignment 638 to the IAB node. In another aspect, the IAB control component 140 may configure a default T_delta 636. The default T_delta 636 may be used if no indication of T_delta 662 is received from a parent node. For example, the default T_delta 636 may have a value of –N_TAoffset/2.

Figure 7:
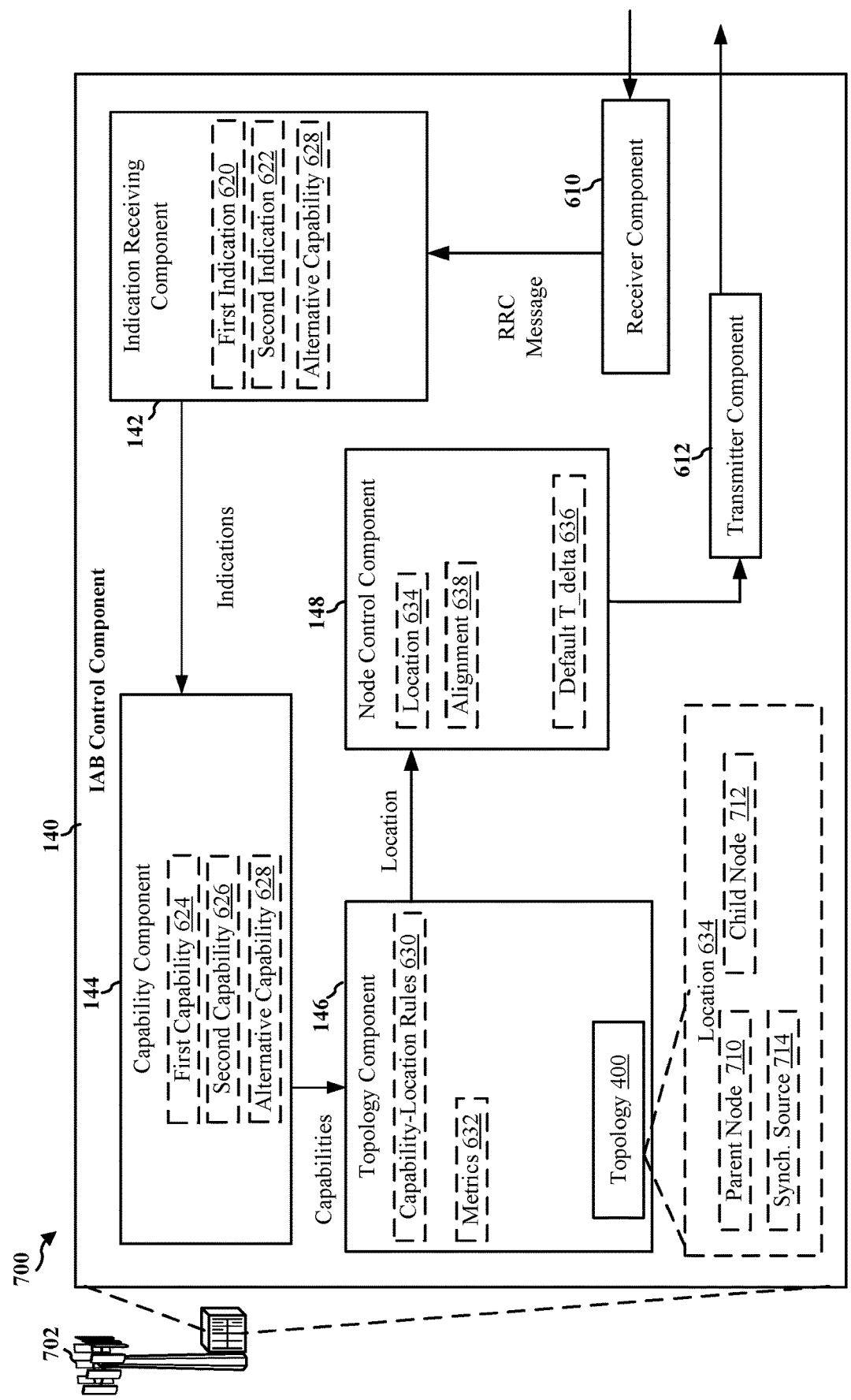
FIG. 7 is a conceptual data flow diagram illustrating the data flow between different means/components in an example base station including an IAB control component.

FIG. 7 is a conceptual data flow diagram 700 illustrating the data flow between different means/components in an example base station 702, which may be an example of the base station 102-*a* including the IAB control component 140.

The base station 702 may include the receiver component 610, which may receive a signal from an IAB node. The receiver component 610 may pass an RRC message including capability indications to the indication receiving component 142. The indication receiving component 142 may extract information elements from the RRC message including a first indication 620, a second indication 622, and/or an alternative capability 628. The indication receiving component 142 may pass the indications to the capability component 144. The capability component 144 may determine a positive or negative result for the first capability 624 and the second capability 626 based on at least one of the first indication 620 or the second indication 622. The capability component 144 may also determine the alternative synchronization source of the alternative capability 628. The capability component 144 may pass the capabilities to the topology component 146. As discussed above, the topology component 146 may determine the topology 400 based on the capabilities. For instance, the topology component 146 may apply the capability-location rules 630 to the capabilities and metrics 632 to determine the topology 400. For each IAB node, the topology 400 may include a location 634, which may include at least one parent node 710, at least one child node 712, and optionally a synchronization source 714. The topology component 146 may pass the location to the node control component 148. The node control component 148 may transmit the location 634 to an IAB node via the transmitter component 612. The node control component 148 may also transmit parameters for synchronization such as alignment 638 or the default T_delta 636.

FIG. 8 is a conceptual data flow diagram 800 illustrating the data flow between different means/components in an example base station 802, which may be an example of the base station 102-*b* and include the IAB synchronization component 198.

The indication component 642 may generate a first indication 620, a second indication 622, and/or an alternative capability 628. The first indication 620 may be based on the IAB DU component 648. The second indication 622 and the alternative capability 628 may be based on the IAB MT component 646. The indication component 642 may transmit the indications to another node via the transmitter component 672.

The receiver component 670 may receive a location configuration message from another node, which may include the IAB control component 140. The receiver component 670 may pass the location configuration message to the location component 144. The receiver component 670 may receive a T_delta from a parent node and pass the T_delta to the IAB MT component and/or the parent synchronization component 646. The location component 144 may extract the location 634 from the location configuration, and may optionally extract an alignment 638 or default T_delta 636. The location component 644 may provide the location 634 to both the IAB DU component 648 and the IAB MT component 646. The location component 644 may provide the alignment 638 or default T_delta 636 IAB MT component 646. The IAB MT component 646 may synchronize the base station 802 with a parent node or alternative synchronization source 652 based on the T_delta or the alignment 638. The IAB DU component 648 may determine the T_delta for a child node and transmit the T_delta to the child node via the transmitter component 672.

Figure 9:
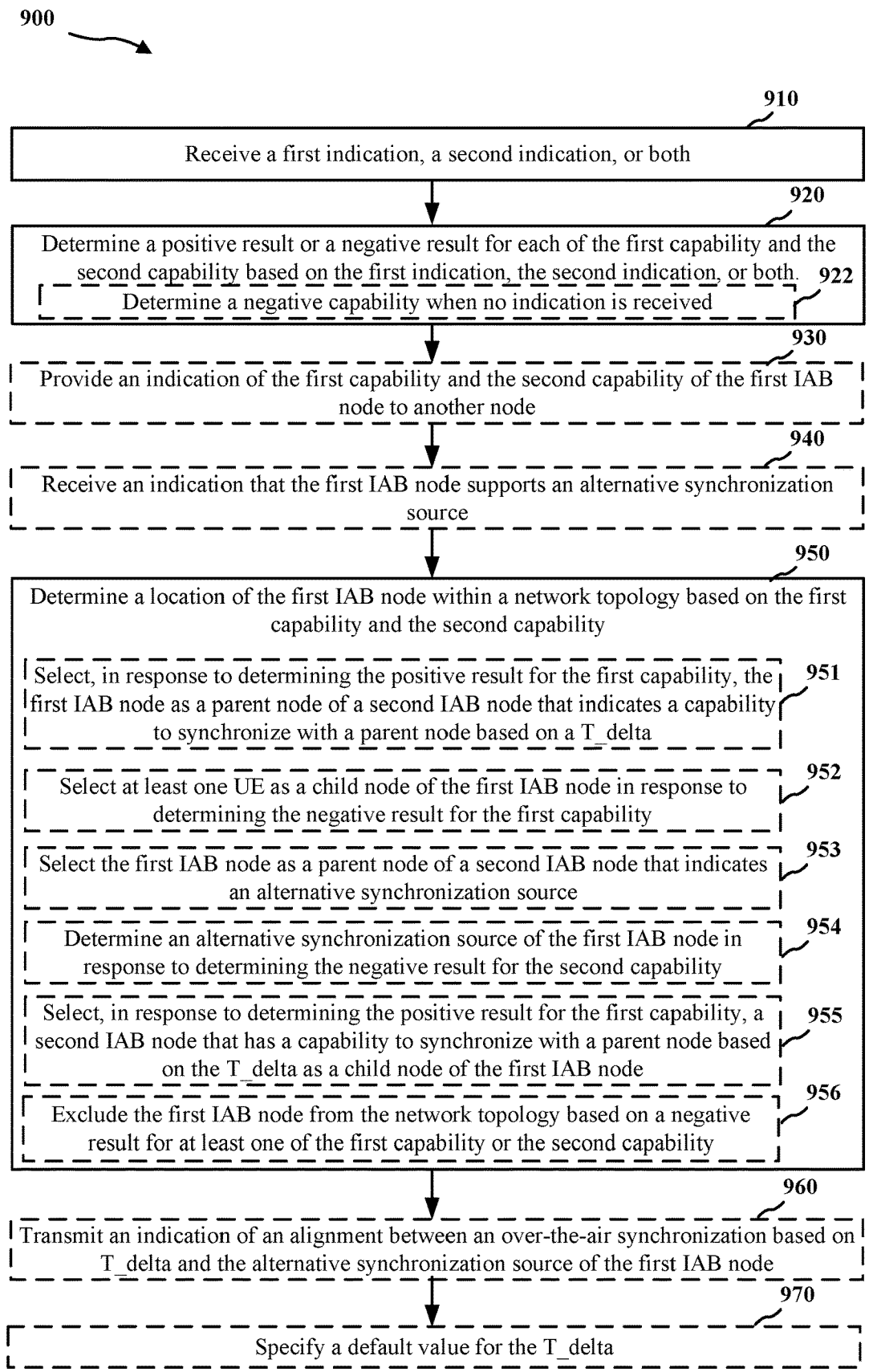
FIG. 9 is a flowchart of an example of a method of determining a location of an IAB node in a network topology

FIG. 9 is a flowchart of an example method 900 for determining a location of an IAB node within a network topology. The method 900 may be performed by base station 102-*a*, which may be a CU or an IAB node and which may include the memory 376 and which may be the entire base station 102 or a component of the base station 102-*a* such as the IAB control component 140, TX processor 316, the RX processor 370, or the controller/processor 375. The method 900 may be performed by the IAB control component 140 in communication with the IAB synchronization component 198 of the base station 102-*b*.

At block 910, the method 900 may include receiving, a first indication, a second indication, or both. In an aspect, for example, the base station 102-*a*, the controller/processor 375, and/or the RX processor 370 may execute the IAB control component 140 and/or the indication receiving component 142 to receive the first indication 620, the second indication 622, or both. The first indication 620 may indicate a first capability 624 of the first IAB node to provide a T_delta 662 to a child node of the first IAB node to enable the child node of the first IAB node to synchronize with the first IAB node. The second indication 622 may indicate a second capability 626 of the first IAB node to synchronize with a parent node of the first IAB node based on a T_delta received by the first IAB node. T_delta may refer to a cell-specific component of a time difference between a DU transmission of a signal from the first IAB node and a reception of the signal at the child node of the first IAB node. Accordingly, the base station 102-*a*, the controller/processor 375, and/or the RX processor 370 executing the IAB control component 140 and/or the indication receiving component 142 may provide means for receiving, a first indication, a second indication, or both.

At block 920, the method 900 may include determining a positive result or a negative result for each of the first capability and the second capability of the first IAB node based the first indication, the second indication, or both. In an aspect, for example, the base station 102-*a*, the controller/processor 375, and/or the RX processor 370 may execute the IAB control component 140 and/or the capability component 144 to determine the first capability 624 and the second capability 626 of the first IAB node based the first indication 620, the second indication 622, or both. For example, at sub-block 922, the block 920 may include determining a negative result for a capability when no indication is received. Accordingly, the base station 102-*a*, the controller/processor 375, and/or the RX processor 370 executing the IAB control component 140 and/or the capability component 144 may provide means for determining a positive result or a negative result for each of the first capability and the second capability of the first IAB node based the first indication, the second indication, or both.

At block 930, the method 900 may optionally include providing an indication of the first capability and the second capability of the first IAB node to another node. In an aspect, for example, the base station 102-a, the controller/processor 375, and/or the TX processor 316 may execute the IAB control component 140 and/or the indication receiving component 142 to provide an indication of the first capability 624 and the second capability 626 of the first IAB node to another node. For example, the other node may be a parent node or a child node of the first IAB node. Accordingly, the base station 102-a, the controller/processor 375, and/or the TX processor 316 executing the IAB control component 140 and/or the indication receiving component 142 may provide means for providing an indication of the first capability and the second capability of the first IAB node to another node.

At block 940, the method 900 may include receiving an indication that the first IAB node supports an alternative synchronization source. In an aspect, for example, the base station 102-a, the controller/processor 375, and/or the RX processor 370 may execute the IAB control component 140 and/or the indication receiving component 142 to receive an indication (e.g., alternative capability 628) that the first IAB node supports an alternative synchronization source 652. Accordingly, the base station 102-a, the controller/processor 375, and/or the RX processor 370 executing the IAB control component 140 and/or the indication receiving component 142 may provide means for receiving an indication that the first IAB node supports an alternative synchronization source.

At block 950, the method 900 may include determining a location of the first IAB node within a network topology based on the first capability and the second capability. In an aspect, for example, the base station 102-a, the controller/processor 375, and/or the RX processor 370 may execute the IAB control component 140 and/or the topology component 146 to determine a location of the first IAB node within a network topology 400 based on the first capability 624 and the second capability 626.

As discussed above with respect to FIG. 6, the topology component 146 may determine the location within the topology based on capability-location rules 630 and/or metrics 632. In an implementation, at sub-block 951 the block 950 may optionally include selecting, in response to determining the positive result for the first capability, the first IAB node as a parent node of a second IAB node that has a capability to synchronize with a parent node based on a T_delta. In an implementation, at sub-block 952 the block 950 may optionally include selecting at least one UE as a child node of the first IAB node in response to determining the negative result for the first capability. In an implementation, at sub-block 953 the block 950 may optionally include selecting the first IAB node as a parent node of a second IAB node that indicates an alternative synchronization source. In an implementation, at sub-block 954 the block 950 may optionally include determining an alternative synchronization source of the first IAB node in response to determining the negative result for the second capability. In an implementation, at sub-block 955 the block 950 may optionally include selecting, in response to determining the positive result for the first capability, a second IAB node that indicates a capability to synchronize with a parent node based on the T_delta as a child node of the first IAB node. In an implementation, at sub-block 956 the block 950 may optionally include excluding the first IAB node from the network topology based on a negative result for at least one of the first capability or the second capability. Accordingly, the base station 102-a, the controller/processor 375, and/or the RX processor 370 executing the IAB control component 140 and/or the indication receiving component 142 may provide means for determining a location of the first IAB node within a network topology based on the first capability and the second capability.

At block 960, the method 900 may optionally include transmitting an indication of an alignment between an over-the-air synchronization based on T_delta and the alternative synchronization source of the first IAB node. In an aspect, for example, the base station 102-a, the controller/processor 375, and/or the TX processor 316 may execute the IAB control component 140 and/or the node control component 148 to transmit an indication of an alignment 638 between an over-the-air synchronization based on T_delta 662 and the alternative synchronization source 652 of the first IAB node. Accordingly, the base station 102-a, the controller/processor 375, and/or the TX processor 316 executing the IAB control component 140 and/or the node control component 148 may provide means for transmitting an indication of an alignment between an over-the-air synchronization based on T_delta and the alternative synchronization source of the first IAB node.

At block 970, the method 900 may optionally include specifying a default value for the T_delta. In an aspect, for example, the base station 102-a, the controller/processor 375, and/or the TX processor 316 may execute the IAB control component 140 and/or the node control component 148 to specify a default value for the T_delta 636. Accordingly, the base station 102-a, the controller/processor 375, and/or the TX processor 316 executing the IAB control component 140 and/or the node control component 148 may provide means for specifying a default value for the T_delta.

Figure 10:
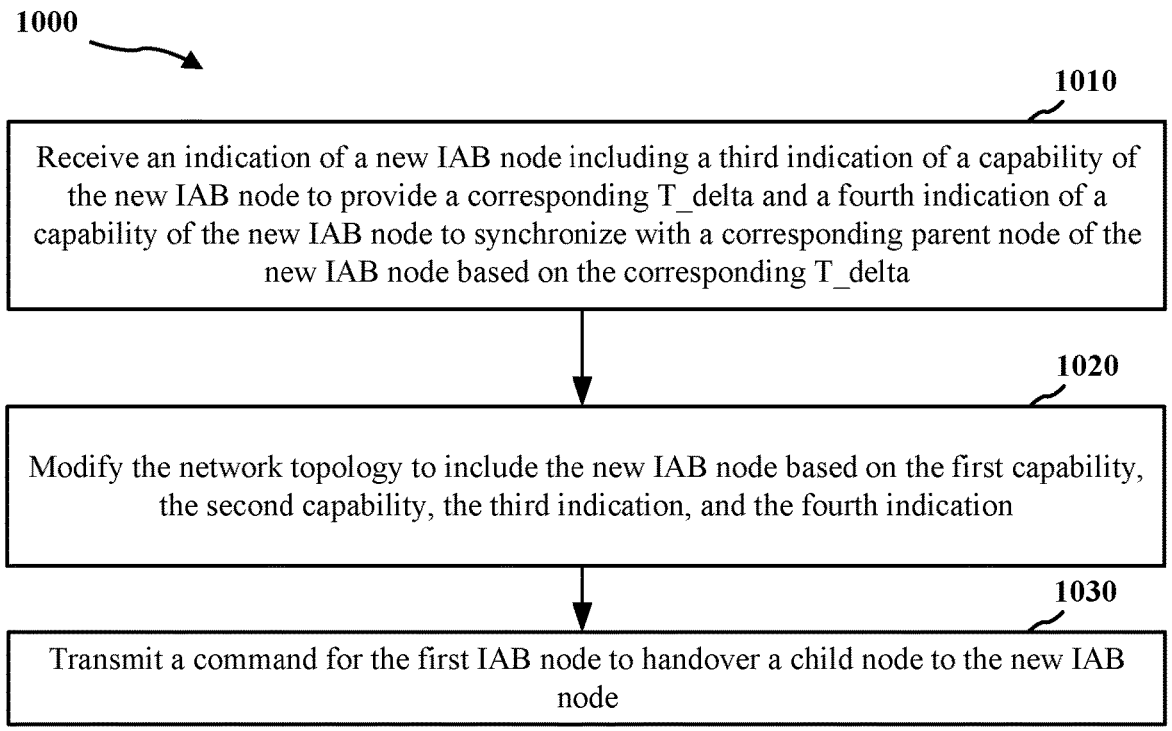
FIG. 10 is a flowchart of an example method of modifying a network topology for a new IAB node.

FIG. 10 is a flowchart of an example method 1000 for modifying a network topology. The method 1000 may be performed after the method 900. The method 1000 may be performed by base station 102-a. The method 900 may be performed by the IAB control component 140 in communication with the IAB synchronization component 198 of the base station 102-b.

At block 1010, the method 1000 may include receiving an indication of a new IAB node including a third indication of a capability of the new IAB node to provide a corresponding T_delta and a fourth indication of a capability of the new IAB node to synchronize with a corresponding parent node of the new IAB node based on the corresponding T_delta. The block 1010 may be similar to the block 910 except performed for a new IAB node instead of the first IAB node. In an aspect, for example, the base station 102-a, the controller/processor 375, and/or the RX processor 370 may execute the IAB control component 140 and/or the indication receiving component 142 to receive an indication of a new IAB node including the third indication and the fourth indication. Accordingly, the base station 102-a, the controller/processor 375, and/or the RX processor 370 executing the IAB control component 140 and/or the indication receiving component 142 may provide means for receiving an indication of a new IAB node including a third indication of a capability of the new IAB node to provide a corresponding T_delta and a fourth indication of a capability of the new IAB node to synchronize with a corresponding parent IAB node based on the corresponding T_delta.

At block 1020, the method 1000 may include modifying the network topology to include the new IAB node based on the first capability, the second capability, the third indication, the fourth indication, or any combination thereof. In an aspect, for example, the base station 102-a, the controller/processor 375, and/or the RX processor 370 may execute the IAB control component 140 and/or the topology component 146 to modify the network topology to include the new IAB node based on the first capability, the second capability, the third indication, the fourth indication, or any combination thereof. For example, the topology component 146 may add the new IAB node to the topology 400 based on the capability-location rules 630. Accordingly, the base station 102-*a*, the controller/processor 375, and/or the RX processor 370 executing the IAB control component 140 and/or the indication receiving component 142 may provide means for modifying the network topology to include the new IAB node based on the first capability, the second capability, the third indication, the fourth indication, or any combination thereof.

At block 1030, the method 1000 may optionally include transmitting a command for the first IAB node to handover a child node to the new IAB node. In an aspect, for example, the base station 102-*a*, the controller/processor 375, and/or the TX processor 316 may execute the IAB control component 140 and/or the node control component 148 to transmit a command for the first IAB node to handover a child node to the new IAB node. Accordingly, the base station 102-*a*, the controller/processor 375, and/or the TX processor 316 executing the IAB control component 140 and/or the node control component 148 may provide means for transmitting a command for the first IAB node to handover a child node to the new IAB node.

Figure 11:
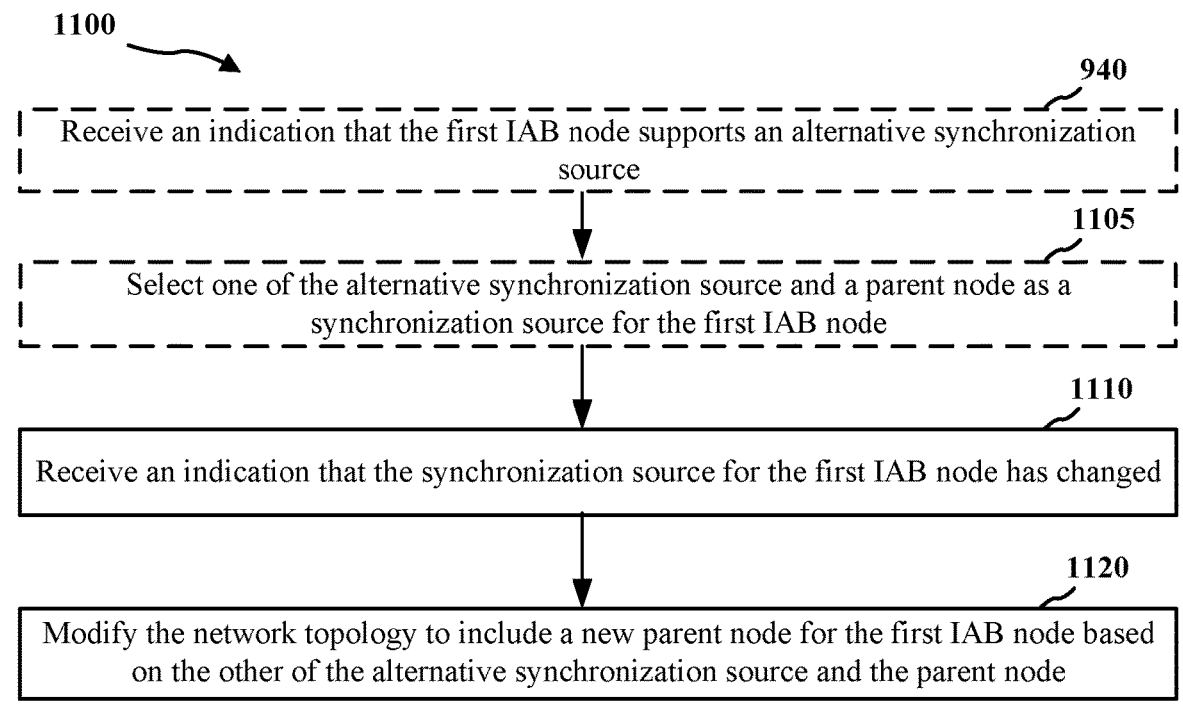
FIG. 11 is a flowchart of an example of a method modifying a network topology based on a change of synchronization source.

FIG. 11 is a flowchart of an example method 1100 for modifying a network topology based on an alternative synchronization source of an IAB node. The method 1100 may be performed after the method 900 where the block 940 is performed as illustrated in the flowchart. The method 1100 may be performed by base station 102-*a*. The method 900 may be performed by the IAB control component 140 in communication with the IAB synchronization component 198 of the base station 102-*b*.

At block 1105, the method 1100 may include selecting one of the alternative synchronization source and the parent node as a synchronization source for the first IAB node. For example, the block 1105 may be performed by the topology component 146 within block 950 of FIG. 9 in response to the block 940.

At block 1110, the method 1100 may include receiving an indication that the synchronization source for the first IAB node has changed. In an aspect, for example, the base station 102-*a*, the controller/processor 375, and/or the RX processor 370 may execute the IAB control component 140 and/or the indication receiving component 142 to receive an indication that the synchronization source for the first IAB node has changed. Accordingly, the base station 102-*a*, the controller/processor 375, and/or the RX processor 370 executing the IAB control component 140 and/or the indication receiving component 142 may provide means for receiving an indication that the synchronization source for the first IAB node has changed.

At block 1120, the method 1000 may optionally include modifying the network topology to include a new parent node for the first IAB node based on the other of the alternative synchronization source and the parent node. In an aspect, for example, the base station 102-*a*, the controller/processor 375, and/or the RX processor 370 may execute the IAB control component 140 and/or the topology component 146 to modify the network topology 400 to include a new parent node 710 for the first IAB node based on the other of the alternative synchronization source 652 and the parent node. Accordingly, the base station 102-*a*, the controller/processor 375, and/or the RX processor 370 executing the IAB control component 140 and/or the indication receiving component 142 may provide means for modifying the network topology to include a new parent node for the first IAB node based on the other of the alternative synchronization source and the parent node.

Figure 12:
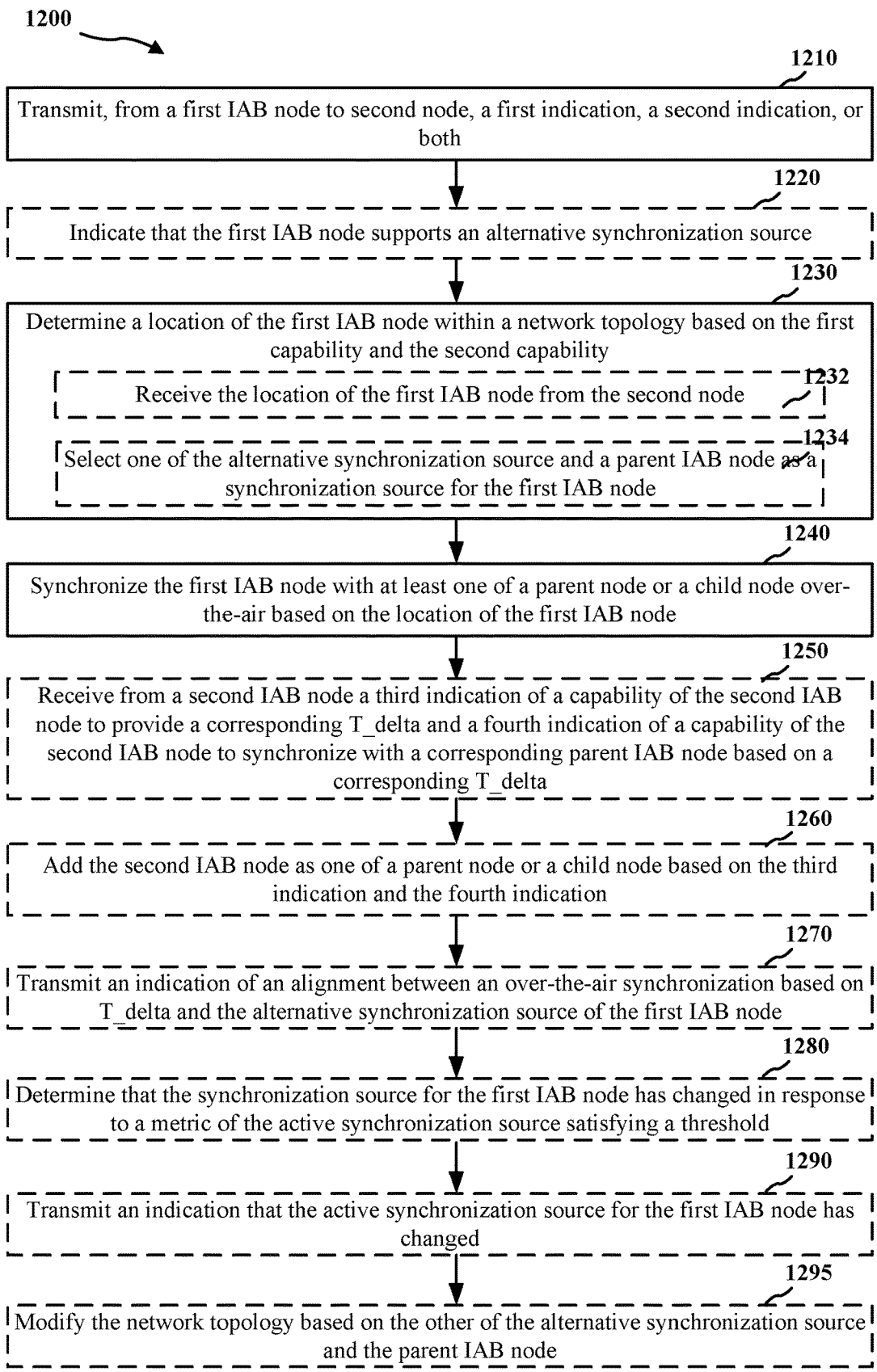
FIG. 12 is a flowchart of an example method of synchronizing an IAB node based on capabilities of the IAB node.

FIG. 12 is a flowchart of an example method 1200 for synchronizing an IAB node with an IAB network based on capabilities of the IAB node. The method 1200 may be performed by a base station such as the base station 102-*b* that includes the IAB MT component 646 that performs the actions of a UE for communicating with a parent node. Accordingly, the base station 102-*b* may include the memory 360 and may be the entire base station 102-*b* or a component of the base station 102-*b* such as the IAB synchronization component 198, TX processor 368, the RX processor 356, or the controller/processor 359. The method 1100 may be performed by the IAB synchronization component 198 in communication with the IAB control component 140 of the base station 102-*a*.

At block 1210, the method 1200 may include transmitting, from a first IAB node to second node, a first indication, a second indication, or both. In an aspect, for example, the base station 102-*b*, the controller/processor 359, or the TX processor 368, may execute the IAB synchronization component 198 and/or the indication component 642 to transmit, from a first IAB node to second node, the first indication 620, the second indication 622, or both. The first indication 620 may indicate a first capability 624 of the first IAB node to provide a T_delta 662 to a child node of the first IAB node. The second indication 622 may indicate a second capability 626 of the first IAB node to synchronize with a parent node based on a T_delta 654 received by the first IAB node. T_delta may refer to a cell-specific component of a time difference between a distributed unit transmission of a signal from the first IAB node and a reception of the signal at the child node of the first IAB node. Accordingly, the base station 102-*b*, the controller/processor 359, or the TX processor 368 executing the IAB synchronization component 198 and/or the indication component 642 may provide means for transmitting, from a first IAB node to second node, a first indication, a second indication, or both.

At block 1220, the method 1200 may optionally include indicating that the first IAB node supports an alternative synchronization source. In an aspect, for example, the base station 102-*b*, the controller/processor 359, the TX processor 368, or the RX processor 356, may execute the IAB synchronization component 198 and/or the indication component 642 to indicate (e.g., transmit alternative capability 628) that the first IAB node supports an alternative synchronization source 652. Accordingly, the base station 102-*b*, the controller/processor 359, or the TX processor 368 executing the IAB synchronization component 198 and/or the indication component 642 may provide means for indicating that the first IAB node supports an alternative synchronization source.

At block 1230, the method 1200 may include determining a location of the first IAB node within a network topology based on the first capability and the second capability. In an aspect, for example, the base station 102-*b*, the controller/processor 359, the TX processor 368, or the RX processor 356, may execute the IAB synchronization component 198 and/or the location component 644 to determine a location of the first IAB node within a network topology 400 based on the first capability 624 and the second capability 626. For example, at sub-block 1232, the block 1230 may include receiving the location 634 of the first IAB node from the second node (e.g., base station 102-*a*). As another example, at sub-block 1234, the block 1230 may include selecting one of the alternative synchronization source 652 and a parent node 710 as a synchronization source for the first IAB node. Accordingly, the base station 102-*b*, the controller/processor 359, the RX processor 356, or the TX processor 368 executing the IAB synchronization component 198 and/or the location component 644 may provide means for determining a location of the first IAB node within a network topology based on the first capability and the second capability.

At block 1240, the method 1200 may include synchronizing the first IAB node with at least one of a parent node or a child node over-the-air based on the location of the first IAB node. In an aspect, for example, the base station 102-*b*, the controller/processor 359, the TX processor 368, or the RX processor 356, may execute the IAB synchronization component 198, the parent synchronization component 650 and/or the child synchronization component 660 to synchronize the first IAB node with at least one of a parent node 710 or a child node 712 over-the-air based on the location 634 of the first IAB node. For example, the parent synchronization component 650 may synchronize with a parent node 710 by receiving the T_delta 662 from the parent node 710. As another example, the child synchronization component 660 may synchronize with a child node 712 by determining the T_delta 662 and transmitting the T_delta 662 to the child node 712 as described above regarding FIG. 4. Accordingly, the base station 102-*b*, controller/processor 359, or the TX processor 368 executing the IAB synchronization component 198, the parent synchronization component 650 and/or the child synchronization component 660 may provide means for synchronizing the first IAB node with at least one of a parent node or a child node over-the-air based on the location of the first IAB node.

At block 1250, the method 1200 may include receiving from a second IAB node a third indication of a capability of the second IAB node to provide a corresponding T_delta and a fourth indication of a capability of the second IAB node to synchronize with a corresponding parent node based on the corresponding T_delta. In an aspect, for example, the base station 102-*b*, the controller/processor 359, or the RX processor 356, may execute the IAB synchronization component 198 and/or the indication component 642 to receive from a second IAB node a third indication of a capability of the second IAB node to provide a corresponding T_delta and a fourth indication of a capability of the second IAB node to synchronize with a corresponding parent node based on a corresponding T_delta. Accordingly, the base station 102-*b*, controller/processor 359, or the RX processor 356 executing the IAB synchronization component 198 and/or the indication component 642 may provide means for receiving from a second IAB node a third indication of a capability of the second IAB node to provide a corresponding T_delta and a fourth indication of a capability of the second IAB node to synchronize with a corresponding parent node based on the corresponding T_delta.

At block 1260, the method 1200 may include adding the second IAB node as one of the parent node of the first IAB node or the child node of the first IAB node based on the third indication and the fourth indication. In an aspect, for example, the base station 102-*b*, the controller/processor 359, the TX processor 368, or the RX processor 356, may execute the IAB synchronization component 198 and/or the location component 644 to add the second IAB node as one of the parent node 710 or the child node 712 based on the third indication and the fourth indication. Accordingly, the base station 102-*b*, controller/processor 359, the TX processor 368, or the RX processor 356 executing the IAB synchronization component 198 and/or the location component 644 may provide means for adding the second IAB node as one of the parent node of the first IAB node or the child node of the first IAB node based on the third indication and the fourth indication.

At block 1270, the method 1200 may include transmitting an indication of an alignment between an over-the-air synchronization based on T_delta and the alternative synchronization source of the first IAB node. In an aspect, for example, the base station 102-*b*, the controller/processor 359, or the TX processor 368 may execute the IAB synchronization component 198 and/or the indication component 642 to transmit an indication of an alignment 638 between an over-the-air synchronization based on T_delta and the alternative synchronization source 652 of the first IAB node. Accordingly, the base station 102-*b*, controller/processor 359, or the TX processor 368 executing the IAB synchronization component 198 and/or the indication component 642 may provide means for transmitting an indication of an alignment between an over-the-air synchronization based on T_delta and the alternative synchronization source of the first IAB node.

At block 1280, the method 1200 may include determining that the synchronization source for the first IAB node has changed in response to a metric of the active synchronization source satisfying a threshold. In an aspect, for example, the base station 102-*b*, the controller/processor 359, the TX processor 368, or the RX processor 356, may execute the IAB synchronization component 198 and/or the parent synchronization component 650 to determine that the synchronization source for the first IAB node has changed in response to a metric of the active synchronization source satisfying a threshold. For instance, a difference in a quality metric between the parent node and an alternative synchronization source may exceed a threshold or a time that the current synchronization source has been unavailable may exceed a threshold time. Accordingly, the base station 102-*b*, controller/processor 359, or the TX processor 368 executing the IAB synchronization component 198 and/or the indication component 642 may provide means for determining that the synchronization source for the first IAB node has changed in response to a metric of the active synchronization source satisfying a threshold.

At block 1290, the method 1200 may include transmitting an indication that the active synchronization source for the first IAB node has changed. In an aspect, for example, the base station 102-*b*, the controller/processor 359, or the TX processor 368 may execute the IAB synchronization component 198 and/or the indication component 642 to transmit an indication that the active synchronization source for the first IAB node has changed. Accordingly, the base station 102-*b*, controller/processor 359, or the TX processor 368 executing the IAB synchronization component 198 and/or the indication component 642 may provide means for transmitting an indication that the active synchronization source for the first IAB node has changed.

At block 1295, the method 1200 may include modifying the network topology based on the other of the alternative synchronization source and the parent node. In an aspect, for example, the base station 102-*b*, the controller/processor 359, the TX processor 368, or the RX processor 356, may execute the IAB synchronization component 198 and/or the location component 644 to modify the network topology 400 based on the other of the alternative synchronization source 652 and the parent node 710. Accordingly, the base station 102-*b*, controller/processor 359, or the TX processor 368 executing the IAB synchronization component 198 and/or the location component 644 may provide means for modifying the network topology based on the other of the alternative synchronization source and the parent node.

SOME FURTHER EXAMPLE CLAUSES

Implementation examples are described in the following numbered clauses:

1. A method of wireless communication, comprising:
receiving a first indication, a second indication, or both, wherein
  the first indication indicates a first capability of a first integrated access and backhaul (IAB) node to provide a T_delta to a child node of the first IAB node to enable the child node of the first IAB node to synchronize with the first IAB node,
  the second indication indicates a second capability of the first IAB node to synchronize with a parent node of the first IAB node based on a T_delta received by the first IAB node, and
  T_delta refers to a cell-specific component of a time difference between a distributed unit transmission of a signal from the first IAB node and a reception of the signal at the child node of the first IAB node;
determining a positive result or a negative result for each of the first capability and the second capability based on the first indication, the second indication, or both, wherein the determining comprises determining the negative result when no indication is received; and
determining a location of the first IAB node within a network topology based on the first capability and the second capability.

2. The method of clause 1, wherein determining the location of the first IAB node within the network topology comprises:
  selecting, in response to determining the positive result for the first capability, the first IAB node as a parent node of a second IAB node that has a capability to synchronize with the parent node of the second IAB node based on a T_delta.

3. The method of clause 1, wherein determining the location of the first IAB node within the network topology comprises:
  selecting at least one user equipment (UE) as a child node of the first IAB node in response to determining the negative result for the first capability.

4. The method of clause 3, wherein determining the location of the first IAB node within the network topology comprises:
  selecting the first IAB node as a parent node of a second IAB node that indicates an alternative synchronization source.

5. The method of any of clauses 1-4, wherein determining the location of the first IAB node within the network topology comprises:
  determining an alternative synchronization source of the first IAB node in response to determining the negative result for the second capability.

6. The method of clause 5, further comprising transmitting an indication of an alignment between an over-the-air synchronization based on the T_delta and the alternative synchronization source of the first IAB node.

7. The method of clause 5, wherein determining the location of the first IAB node within the network topology further comprises:
  selecting, in response to determining the positive result for the first capability, a second IAB node that indicates a capability to synchronize with a parent node of the second IAB node based on the T_delta as a child node of the first IAB node.

8. The method of any of clauses 1-7, further comprising:
  receiving an indication of a new IAB node including a third indication of a third capability of the new IAB node to provide a corresponding T_delta and a fourth indication of a fourth capability of the new IAB node to synchronize with a corresponding parent node of the new IAB node based on the corresponding T_delta; and
  modifying the network topology to include the new IAB node based on the first capability, the second capability, the third indication, or the fourth indication, or any combination thereof.

9. The method of clause 8, wherein modifying the network topology comprises transmitting a command for the first IAB node to handover a child node of the first IAB node to the new IAB node.

10. The method of any of clauses 1-9, further comprising:
  receiving an indication that the first IAB node supports an alternative synchronization source, wherein determining the location within the network topology comprises selecting one of the alternative synchronization source and the parent node of the first IAB node as a synchronization source for the first IAB node.

11. The method of clause 10, further comprising:
  receiving an indication that the synchronization source for the first IAB node has changed; and
  modifying the network topology to include a new parent node for the first IAB node based on the other of the alternative synchronization source and the parent node of the first IAB node.

12. The method of any of clauses 1-11, further comprising specifying a default value for the T_delta.

13. The method of any of clauses 1-12, further comprising providing an indication of the first capability and the second capability of the first IAB node to another node.

14. The method of any of clauses 1, wherein determining the location of the first IAB node within the network topology based on the first capability and the second capability comprises excluding the first IAB node from the network topology based on determining the negative result for at least one of the first capability or the second capability.

15. An apparatus for wireless communication, comprising:
  a memory; and
  at least one processor coupled to the memory and configured to:
    receive a first indication, a second indication, or both, wherein
      the first indication indicates a first capability of a first integrated access and backhaul (IAB) node to provide a T_delta to a child node of the first IAB node to enable the child node of the first IAB node to synchronize with the first IAB node,
      the second indication indicates a second capability of the first IAB node to synchronize with a parent node of the first IAB node based on a T_delta received by the first IAB node, and
      T_delta refers to a cell-specific component of a time difference between a distributed unit transmission of a signal from the first IAB node and a reception of the signal at the child node of the first IAB node;
    determine a positive result or a negative result for each of the first capability and the second capability based on the first indication, the second indication, or both, wherein the determining comprises determining the negative result when no indication is received; and determine a location of the first IAB node within a network topology based on the first capability and the second capability.

16. The apparatus of clause 15, wherein the at least one processor is configured to select, in response to determining the positive result for the first capability, the first IAB node as a parent node of a second IAB node that has a capability to synchronize with the parent node of the second IAB node based on a T_delta.

17. The apparatus of clause 15, wherein the at least one processor is configured to select at least one user equipment (UE) as a child node of the first IAB node in response to determining the negative result for the first capability.

18. The apparatus of clause 17, wherein the at least one processor is configured to select the first IAB node as a parent node of a second IAB node that indicates an alternative synchronization source.

19. The apparatus of any of clauses 15-18, wherein the at least one processor is configured to determine an alternative synchronization source of the first IAB node in response to determining the negative result for the second capability.

20. The apparatus of clause 19, wherein the at least one processor is configured to transmit an indication of an alignment between an over-the-air synchronization based on the T_delta and the alternative synchronization source of the first IAB node.

21. The apparatus of clause 19, wherein the at least one processor is configured to select, in response to determining the positive result for the first capability, a second IAB node that indicates a capability to synchronize with a parent node of the first IAB node based on the T_delta as a child node of the first IAB node.

22. The apparatus of any of clauses 15-21, wherein the at least one processor is further configured to:
receive an indication of a new IAB node including a third indication of a third capability of the new IAB node to provide a corresponding T_delta and a fourth indication of a fourth capability of the new IAB node to synchronize with a corresponding parent node of the new IAB node based on the corresponding T_delta; and
modify the network topology to include the new IAB node based on the first capability, the second capability, the third indication, or the fourth indication, or any combination thereof.

23. The apparatus of clause 22, wherein the at least one processor is configured transmit a command for the first IAB node to handover a child node of the first IAB node to the new IAB node.

24. The apparatus of any of clauses 15-23, wherein the at least one processor is further configured to receive an indication that the first IAB node supports an alternative synchronization source, and select one of the alternative synchronization source and the parent node of the first IAB node as a synchronization source for the first IAB node.

25. The apparatus of clause 24, wherein the at least one processor is further configured to:
receive an indication that the synchronization source for the first IAB node has changed; and
modify the network topology to include a new parent node for the first IAB node based on the other of the alternative synchronization source and the parent node of the first IAB node.

26. The apparatus of any of clauses 15-25, wherein the at least one processor is further configured to specify a default value for the T_delta.

27. The apparatus of any of clauses 15-26, wherein the at least one processor is further configured to provide an indication of the first capability and the second capability of the first IAB node to another node.

28. The apparatus of clause 15, wherein the at least one processor is configured to exclude the first IAB node from the network topology based on determining the negative result for at least one of the first capability or the second capability.

29. An apparatus for wireless communication, comprising:
means for receiving a first indication, a second indication, or both, wherein
the first indication indicates a first capability of a first integrated access and backhaul (IAB) node to provide a T_delta to a child node of the first IAB node to enable the child node of the first IAB node to synchronize with the first IAB node,
the second indication indicates a second capability of the first IAB node to synchronize with a parent node of the first IAB node based on a T_delta received by the first IAB node, and
T_delta refers to a cell-specific component of a time difference between a distributed unit transmission of a signal from the first IAB node and a reception of the signal at the child node of the first IAB node;
means for determining a positive result or a negative result for each of the first capability and the second capability based on the first indication, the second indication, or both, wherein the determining comprises determining the negative result when no indication is received; and
means for determining a location of the first IAB node within a network topology based on the first capability and the second capability.

30. The apparatus of clause 29, wherein the means for determining the location of the first IAB node within the network topology is configured to:
select, in response to determining the positive result for the first capability, the first IAB node as a parent node of a second IAB node that has a capability to synchronize with the parent node of the second IAB node based on a T_delta.

31. The apparatus of clause 29, wherein the means for determining the location of the first IAB node within the network topology is configured to:
select at least one user equipment (UE) as a child node of the first IAB node in response to determining the negative result for the first capability.

32. The apparatus of clause 31, wherein the means for determining the location of the first IAB node within the network topology is configured to:
selecting the first IAB node as a parent node of a second IAB node that indicates an alternative synchronization source.

33. The apparatus of any of clauses 29-32, wherein the means for determining the location of the first IAB node within the network topology is configured to:
determine an alternative synchronization source of the first IAB node in response to determining the negative result for the second capability.

34. The apparatus of clause 33, further comprising mean for transmitting an indication of an alignment between an over-the-air synchronization based on the T_delta and the alternative synchronization source of the first IAB node.

35. The apparatus of clause 33, wherein the means for determining the location of the first IAB node within the network topology is configured to:
  select, in response to determining the positive result for the first capability, a second IAB node that indicates a capability to synchronize with a parent node of the second IAB node based on the T_delta as a child node of the first IAB node.

36. The apparatus of any of clauses 29-35, further comprising:
  means for receiving an indication of a new IAB node including a third indication of a third capability of the new IAB node to provide a corresponding T_delta and a fourth indication of a fourth capability of the new IAB node to synchronize with a corresponding parent node of the new IAB node based on the corresponding T_delta; and
  means for modifying the network topology to include the new IAB node based on the first capability, the second capability, the third indication, or the fourth indication, or any combination thereof.

37. The apparatus of clause 36, wherein the means for modifying the network topology is configured to transmit a command for the first IAB node to handover a child node of the first IAB node to the new IAB node.

38. The apparatus of any of clauses 29-37, further comprising:
  means for receiving an indication that the first IAB node supports an alternative synchronization source, wherein determining the location within the network topology comprises selecting one of the alternative synchronization source and the parent node of the first IAB node as a synchronization source for the first IAB node.

39. The apparatus of clause 38, further comprising:
  means for receiving an indication that the synchronization source for the first IAB node has changed; and
  means for modifying the network topology to include a new parent node for the first IAB node based on the other of the alternative synchronization source and the parent node of the first IAB node.

40. The apparatus of any of clauses 29-39, further comprising means for specifying a default value for the T_delta.

41. The apparatus of any of clauses 29-40, further comprising means for providing an indication of the first capability and the second capability of the first IAB node to another node.

42. The apparatus of clause 29, wherein the means for determining the location of the first IAB node within the network topology based on the first capability and the second capability is configured to exclude the first IAB node from the network topology based on determining the negative result for at least one of the first capability or the second capability.

43. A non-transitory computer-readable medium storing computer executable code, the code when executed by a processor causes the processor to:
  receive a first indication, a second indication, or both, wherein
    the first indication indicates a first capability of a first integrated access and backhaul (IAB) node to provide a T_delta to a child node of the first IAB node to enable the child node of the first IAB node to synchronize with the first IAB node,
    the second indication indicates a second capability of the first IAB node to synchronize with a parent node of the first IAB node based on a T_delta received by the first IAB node, and
    T_delta refers to a cell-specific component of a time difference between a distributed unit transmission of a signal from the first IAB node and a reception of the signal at the child node of the first IAB node;
  determine a positive result or a negative result for each of the first capability and the second capability based on the first indication, the second indication, or both, wherein the determining comprises determining the negative result when no indication is received; and
  determine a location of the first IAB node within a network topology based on the first capability and the second capability.

44. The non-transitory computer-readable medium of clause 43, wherein the code to determine the location of the first IAB node within the network topology comprises code to:
  selecting, in response to determining the positive result for the first capability, the first IAB node as a parent node of a second IAB node that has a capability to synchronize with the parent node of the second IAB node based on a T_delta.

45. The non-transitory computer-readable medium of clause 43, wherein the code to determine the location of the first IAB node within the network topology comprises code to:
  select at least one user equipment (UE) as a child node of the first IAB node in response to determining the negative result for the first capability.

46. The non-transitory computer-readable medium of clause 44, wherein the code to determine the location of the first IAB node within the network topology comprises code to:
  select the first IAB node as a parent node of a second IAB node that indicates an alternative synchronization source.

47. The non-transitory computer-readable medium of any of clauses 43-46, wherein the code to determine the location of the first IAB node within the network topology comprises code to:
  determine an alternative synchronization source of the first IAB node in response to determining the negative result for the second capability.

48. The non-transitory computer-readable medium of clause 47, further comprising code to transmit an indication of an alignment between an over-the-air synchronization based on the T_delta and the alternative synchronization source of the first IAB node.

49. The non-transitory computer-readable medium of clause 47, wherein the code to determine the location of the first IAB node within the network topology further comprises code to:
  select, in response to determining the positive result for the first capability, a second IAB node that indicates a capability to synchronize with a parent node of the second IAB node based on the T_delta as a child node of the first IAB node.

50. The non-transitory computer-readable medium of any of clauses 43-49, further comprising code to:
  receive an indication of a new IAB node including a third indication of a third capability of the new IAB node to provide a corresponding T_delta and a fourth indication of a fourth capability of the new IAB node to synchronize with a corresponding parent node of the new IAB node based on the corresponding T_delta; and modify the network topology to include the new IAB node based on the first capability, the second capability, the third indication, or the fourth indication, or any combination thereof.

51. The non-transitory computer-readable medium of clause 50, wherein the code to modify the network topology comprises code to transmit a command for the first IAB node to handover a child node of the first IAB node to the new IAB node.

52. The non-transitory computer-readable medium of any of clauses 43-51, further comprising code to:

receive an indication that the first IAB node supports an alternative synchronization source, wherein determining the location within the network topology comprises selecting one of the alternative synchronization source and the parent node of the first IAB node as a synchronization source for the first IAB node.

53. The non-transitory computer-readable medium of clause 52, further comprising code to:

receive an indication that the synchronization source for the first IAB node has changed; and modify the network topology to include a new parent node for the first IAB node based on the other of the alternative synchronization source and the parent node of the first IAB node.

54. The non-transitory computer-readable medium of any of clauses 43-53, further comprising code to specify a default value for the T_delta.

55. The non-transitory computer-readable medium of any of clauses 43-54, further comprising code to provide an indication of the first capability and the second capability of the first IAB node to another node.

56. The non-transitory computer-readable medium of clause 43, wherein the code to determine the location of the first IAB node within the network topology based on the first capability and the second capability comprises excluding the first IAB node from the network topology based on determining the negative result for at least one of the first capability or the second capability.

57. A method of wireless communication, comprising:

transmitting, from a first integrated access and backhaul (IAB) node to second node, a first indication, a second indication, or both, wherein the first indication indicates a first capability of the first IAB node to provide a T_delta to a child node of the first IAB node, the second indication indicates a second capability of the first IAB node to synchronize with a parent node based on a T_delta received by the first IAB node, and T_delta refers to a cell-specific component of a time difference between a distributed unit transmission of a signal from the first IAB node and a reception of the signal at the child node of the first IAB node;

determining a location of the first IAB node within a network topology based on the first capability and the second capability; and synchronizing the first IAB node with at least one of the parent node of the first IAB node or the child node of the first IAB node over-the-air based on the location of the first IAB node.

58. The method of clause 57, wherein determining the location of the first IAB node comprises receiving the location of the first IAB node from the second node.

59. The method of clause 57 or 58, wherein the second node is one of: a central unit (CU), the parent node of the first IAB node, or the child node of the first IAB node.

60. The method of any of clauses 57-59, further comprising:

receiving from a second IAB node a third indication of a capability of the second IAB node to provide a corresponding T_delta and a fourth indication of a capability of the second IAB node to synchronize with a corresponding parent node based on the corresponding T_delta; and adding the second IAB node as one of the parent node of the first IAB node or the child node of the first IAB node based on the third indication and the fourth indication.

61. The method of any of clauses 57-60, further comprising indicating that the first IAB node supports an alternative synchronization source, wherein determining the network topology comprises selecting one of the alternative synchronization source and the parent node of the first IAB node as an active synchronization source for the first IAB node.

62. The method of clause 61, further comprising:

determining that the active synchronization source for the first IAB node has changed in response to a metric of the active synchronization source satisfying a threshold;

transmitting an indication that the active synchronization source for the first IAB node has changed; and modifying the network topology based on the other of the alternative synchronization source and the parent node of the first IAB node.

63. The method of clause 61, further comprising transmitting an indication of an alignment between an over-the-air synchronization based on T_delta and the alternative synchronization source of the first IAB node.

64. The method of any of clauses 57-63, wherein, responsive to a determination of a positive result for the second capability, further comprising:

determining to change from the parent node of the first IAB node to a second parent node; and synchronizing with the second parent node based on a default value of T_delta.

65. The method clause 64, further comprising:

determining a second value of T_delta for the second parent node based on a transmission from the second parent node; and synchronizing with the second parent node based on the second value of T_delta.

66. An apparatus for wireless communication, comprising:

a memory; and at least one processor coupled to the memory and configured to:

transmit, from a first integrated access and backhaul (IAB) node to second node, a first indication, a second indication, or both, wherein the first indication indicates a first capability of the first IAB node to provide a T_delta to a child node of the first IAB node, the second indication indicates a second capability of the first IAB node to synchronize with a parent node of the first IAB node based on a T_delta received by the first IAB node, and T_delta refers to a cell-specific component of a time difference between a distributed unit transmission of a signal from the first IAB node and a reception of the signal at the child node of the first IAB node;

determine a location of the first IAB node within a network topology based on the first capability and the second capability; and synchronize the first IAB node with at least one of the parent node of the first IAB node or the child node of the first IAB node over-the-air based on the location of the first IAB node.

67. The apparatus of clause 66, wherein the at least one processor is configured to receive the location of the first IAB node from the second node.

68. The apparatus of clause 66 or 67, wherein the second node is one of: a central unit (CU), the parent node of the first IAB node, or the child node of the first IAB node.

69. The apparatus of any of clauses 66-68, wherein the at least one processor is configured to:

receive from a second IAB node a third indication of a capability of the second IAB node to provide a corresponding T_delta and a fourth indication of a capability of the second IAB node to synchronize with a corresponding parent node based on the corresponding T_delta; and add the second IAB node as one of the parent node of the first IAB node or the child node of the first IAB node based on the third indication and the fourth indication.

70. The apparatus of any of clauses 66-69, wherein the at least one processor is configured to:

indicate that the first IAB node supports an alternative synchronization source; and select one of the alternative synchronization source and the parent node of the first IAB node as an active synchronization source for the first IAB node.

71. The apparatus of clause 70, wherein the at least one processor is configured to:

determine that the active synchronization source for the first IAB node has changed in response to a metric of the active synchronization source satisfying a threshold;

transmit an indication that the active synchronization source for the first IAB node has changed; and modify the network topology based on the other of the alternative synchronization source and the parent node of the first IAB node.

72. The apparatus of clause 70, wherein the at least one processor is configured to transmit an indication of an alignment between an over-the-air synchronization based on T_delta and the alternative synchronization source of the first IAB node.

73. The apparatus of any of clauses 66-72, wherein, responsive to a determination of a positive result for the second capability, the at least one processor is configured to:

determine to change from the parent node of the first IAB node to a second parent node; and synchronize with the second parent node based on a default value of T_delta.

74. The apparatus of clause 73, wherein the at least one processor is configured to:

determine a second value of T_delta for the second parent node based on a transmission from the second parent node; and synchronize with the second parent node based on the second value of T_delta.

75. An apparatus for wireless communication, comprising:

means for transmitting, from a first integrated access and backhaul (IAB) node to second node, a first indication, a second indication, or both, wherein the first indication indicates a first capability of the first IAB node to provide a T_delta to a child node of the first IAB node, the second indication indicates a second capability of the first IAB node to synchronize with a parent node of the first IAB node based on a T_delta received by the first IAB node, and T_delta refers to a cell-specific component of a time difference between a distributed unit transmission of a signal from the first IAB node and a reception of the signal at the child node of the first IAB node;

means for determining a location of the first IAB node within a network topology based on the first capability and the second capability; and means for synchronizing the first IAB node with at least one of the parent node of the first IAB node or the child node of the first IAB node over-the-air based on the location of the first IAB node.

76. The apparatus of clause 75, wherein the means for determining the location of the first IAB node is configured to receive the location of the first IAB node from the second node.

77. The apparatus of clause 75 or 76, wherein the second node is one of: a central unit (CU), the parent node of the first IAB node, or the child node of the first IAB node.

78. The apparatus of any of clauses 75-77, further comprising:

means for receiving from a second IAB node a third indication of a capability of the second IAB node to provide a corresponding T_delta and a fourth indication of a capability of the second IAB node to synchronize with a corresponding parent node based on the corresponding T_delta, wherein the means for determining a location of the first IAB node is configured to add the second IAB node as one of the parent node of the first IAB node or the child node of the first IAB node based on the third indication and the fourth indication.

79. The apparatus of any of clauses 75-78, further comprising means for indicating that the first IAB node supports an alternative synchronization source, wherein the means for determining the network topology is configured to select one of the alternative synchronization source and a parent node of the first IAB node as an active synchronization source for the first IAB node.

80. The apparatus of clause 79, further comprising:

means for determining that the active synchronization source for the first IAB node has changed in response to a metric of the active synchronization source satisfying a threshold;

means for transmitting an indication that the active synchronization source for the first IAB node has changed; and means for modifying the network topology based on the other of the alternative synchronization source and the parent node of the first IAB node.

81. The apparatus of clause 79, further comprising means for transmitting an indication of an alignment between an over-the-air synchronization based on T_delta and the alternative synchronization source of the first IAB node.

82. The apparatus of any of clauses 75-81, wherein, responsive to a determination of a positive result for the second capability, the means for determining the location is configured to determine to change from the parent node of the first IAB node to a second parent node; and the means for synchronizing is configured to synchronize with the second parent node based on a default value of T_delta.

83. The apparatus of clause 82, further comprising:
means for determining a second value of T_delta for the second parent node based on a transmission from the second parent node, wherein the means for synchronizing is configured to synchronize with the second parent node based on the second value of T_delta.

84. A non-transitory computer-readable medium storing computer executable code, the code when executed by a processor causes the processor to:
transmit, from a first integrated access and backhaul (IAB) node to second node, a first indication, a second indication, or both, wherein
the first indication indicates a first capability of the first IAB node to provide a T_delta to a child node of the first IAB node,
the second indication indicates a second capability of the first IAB node to synchronize with a parent node of the first IAB node based on a T_delta received by the first IAB node, and
T_delta refers to a cell-specific component of a time difference between a distributed unit transmission of a signal from the first IAB node and a reception of the signal at the child node of the first IAB node;
determine a location of the first IAB node within a network topology based on the first capability and the second capability; and
synchronize the first IAB node with at least one of the parent node of the first IAB node or the child node of the first IAB node over-the-air based on the location of the first IAB node.

85. The non-transitory computer-readable medium of clause 84, further comprising code to receive the location of the first IAB node from the second node.

86. The non-transitory computer-readable medium of clause 84 or 85, wherein the second node is one of: a central unit (CU), the parent node of the first IAB node, or the child node of the first IAB node.

87. The non-transitory computer-readable medium of any of clauses 84-86, further comprising code to:
receive from a second IAB node a third indication of a capability of the second IAB node to provide a corresponding T_delta and a fourth indication of a capability of the second IAB node to synchronize with a corresponding parent node based on the corresponding T_delta; and
add the second IAB node as one of the parent node of the first IAB node or the child node of the first IAB node based on the third indication and the fourth indication.

88. The non-transitory computer-readable medium of any of clauses 84-87, further comprising code to:
indicate that the first IAB node supports an alternative synchronization source; and
select one of the alternative synchronization source and the parent node of the first IAB node as an active synchronization source for the first IAB node.

89. The non-transitory computer-readable medium of clause 88, further comprising code to:
determine that the active synchronization source for the first IAB node has changed in response to a metric of the active synchronization source satisfying a threshold;
transmit an indication that the active synchronization source for the first IAB node has changed; and
modify the network topology based on the other of the alternative synchronization source and the parent node of the first IAB node.

90. The non-transitory computer-readable medium of clause 88, further comprising code to transmit an indication of an alignment between an over-the-air synchronization based on T_delta and the alternative synchronization source of the first IAB node.

91. The non-transitory computer-readable medium of any of clauses 84-90, further comprising code to, responsive to a determination of a positive result for the second capability:
determine to change from the parent node of the first IAB node to a second parent node; and
synchronize with the second parent node based on a default value of T_delta.

92. The non-transitory computer-readable medium of clause 91, further comprising code to:
determine a second value of T_delta for the second parent node based on a transmission from the second parent node; and
synchronize with the second parent node based on the second value of T_delta.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
    receiving a first indication, a second indication, or both, wherein
        the first indication indicates a first capability of a first integrated access and backhaul (IAB) node to provide a T_delta to a child node of the first IAB node to enable the child node of the first IAB node to synchronize with the first IAB node,
        the second indication indicates a second capability of the first IAB node to synchronize with a parent node of the first IAB node based on a T_delta received by the first IAB node, and
        T_delta refers to a cell-specific component of a time difference between a distributed unit transmission of a signal from the first IAB node and a reception of the signal at the child node of the first IAB node;
    determining a positive result or a negative result for each of the first capability and the second capability based on the first indication, the second indication, or both, wherein the determining comprises determining the negative result when no indication is received; and
    determining a location of the first IAB node within a network topology based on the first capability and the second capability.

2. The method of claim 1, wherein determining the location of the first IAB node within the network topology comprises:
    selecting, in response to determining the positive result for the first capability, the first IAB node as a parent node of a second IAB node that has a capability to synchronize with the parent node of the second IAB node based on a T_delta.

3. The method of claim 1, wherein determining the location of the first IAB node within the network topology comprises:
    selecting at least one user equipment (UE) as a child node of the first IAB node in response to determining the negative result for the first capability.

4. The method of claim 3, wherein determining the location of the first IAB node within the network topology comprises:
    selecting the first IAB node as a parent node of a second IAB node that indicates an alternative synchronization source.

5. The method of claim 1, wherein determining the location of the first IAB node within the network topology comprises:
    determining an alternative synchronization source of the first IAB node in response to determining the negative result for the second capability.

6. The method of claim 5, further comprising transmitting an indication of an alignment between an over-the-air synchronization based on T_delta and the alternative synchronization source of the first IAB node.

7. The method of claim 5, wherein determining the location of the first IAB node within the network topology further comprises:
    selecting, in response to determining the positive result for the first capability, a second IAB node that indicates a capability to synchronize with a parent node of the second IAB node based on the T_delta as a child node of the first IAB node.

8. The method of claim 1, further comprising:
    receiving an indication of a new IAB node including a third indication of a capability of the new IAB node to provide a corresponding T_delta and a fourth indication of a capability of the new IAB node to synchronize with a corresponding parent node of the new IAB node based on the corresponding T_delta; and
    modifying the network topology to include the new IAB node based on the first capability, the second capability, the third indication, or the fourth indication, or any combination thereof.

9. The method of claim 8, wherein modifying the network topology comprises transmitting a command for the first IAB node to handover a child node of the first IAB node to the new IAB node.

10. The method of claim 1, further comprising:
    receiving an indication that the first IAB node supports an alternative synchronization source, wherein determining the location within the network topology comprises selecting one of the alternative synchronization source and the parent node of the first IAB node as a synchronization source for the first IAB node.

11. The method of claim 10, further comprising:
    receiving an indication that the synchronization source for the first IAB node has changed; and
    modifying the network topology to include a new parent node for the first IAB node based on the other of the alternative synchronization source and the parent node of the first IAB node.

12. The method of claim 1, further comprising specifying a default value for the T_delta.

13. The method of claim 1, further comprising providing an indication of the first capability and the second capability of the first IAB node to another node.

14. The method of claim 1, wherein determining the location of the first IAB node within the network topology based on the first capability and the second capability comprises excluding the first IAB node from the network topology based on determining the negative result for at least one of the first capability or the second capability.

15. A method of wireless communication, comprising:
    transmitting, from a first integrated access and backhaul (IAB) node to second node, a first indication, a second indication, or both, wherein
        the first indication indicates a first capability of the first IAB node to provide a T_delta to a child node of the first IAB node,
        the second indication indicates a second capability of the first IAB node to synchronize with a parent node of the first IAB node based on a T_delta received by the first IAB node, and
        T_delta refers to a cell-specific component of a time difference between a distributed unit transmission of a signal from the first IAB node and a reception of the signal at the child node of the first IAB node;
    determining a location of the first IAB node within a network topology based on the first capability and the second capability; and
    synchronizing the first IAB node with at least one of the parent node of the first IAB node or the child node of the first IAB node over-the-air based on the location of the first IAB node.

16. The method of claim 15, wherein determining the location of the first IAB node comprises receiving the location of the first IAB node from the second node.

17. The method of claim 15, wherein the second node is one of: a central unit (CU), the parent node of the first IAB node, or the child node of the first IAB node.

18. The method of claim 15, further comprising:
    receiving from a second IAB node a third indication of a capability of the second IAB node to provide a corresponding T_delta and a fourth indication of a capability of the second IAB node to synchronize with a corresponding parent node based on the corresponding T_delta; and adding the second IAB node as one of the parent node of the first IAB node or the child node of the first IAB node based on the third indication and the fourth indication.

19. The method of claim 15, further comprising indicating that the first IAB node supports an alternative synchronization source, wherein determining the network topology comprises selecting one of the alternative synchronization source and a parent node of the first IAB node as an active synchronization source for the first IAB node.

20. The method of claim 19, further comprising:
determining that the active synchronization source for the first IAB node has changed in response to a metric of the active synchronization source satisfying a threshold;
transmitting an indication that the active synchronization source for the first IAB node has changed; and
modifying the network topology based on the other of the alternative synchronization source and the parent node of the first IAB node.

21. The method of claim 19, further comprising transmitting an indication of an alignment between an over-the-air synchronization based on T_delta and the alternative synchronization source of the first IAB node.

22. The method of claim 15, wherein, responsive to a determination of a positive result for the second capability, further comprising:
determining to change from the parent node of the first IAB node to a second parent node; and
synchronizing with the second parent node based on a default value of T_delta.

23. The method claim 22, further comprising:
determining a second value of T_delta for the second parent node based on a transmission from the second parent node; and
synchronizing with the second parent node based on the second value of T_delta.

24. An apparatus for wireless communication, comprising:
a memory; and
at least one processor coupled to the memory and configured to:
receive a first indication, a second indication, or both, wherein
the first indication indicates a first capability of a first integrated access and backhaul (IAB) node to provide a T_delta to a child node of the first IAB node to enable the child node of the first IAB node to synchronize with the first IAB node,
the second indication indicates a second capability of the first IAB node to synchronize with a parent node of the first IAB node based on a T_delta received by the first IAB node, and
T_delta refers to a cell-specific component of a time difference between a distributed unit transmission of a signal from the first IAB node and a reception of the signal at the child node of the first IAB node;
determine a positive result or a negative result for each of the first capability and the second capability based on the first indication, the second indication, or both,
wherein the determining comprises determining the negative result when no indication is received; and
determine a location of the first IAB node within a network topology based on the first capability and the second capability.

25. The apparatus of claim 24, wherein the at least one processor is configured to select, in response to determining the positive result for the first capability, the first IAB node as a parent node of a second IAB node that has a capability to synchronize with the parent node of the second IAB node based on a T_delta.

26. The apparatus of claim 24, wherein the at least one processor is configured to select at least one user equipment (UE) as a child node of the first IAB node in response to determining the negative result for the first capability.

27. The apparatus of claim 24, wherein the at least one processor is configured to determine an alternative synchronization source of the first IAB node in response to determining the negative result for the second capability.

28. The apparatus of claim 24, wherein the at least one processor is further configured to:
receive an indication of a new IAB node including a third indication of a capability of the new IAB node to provide a corresponding T_delta and a fourth indication of a capability of the new IAB node to synchronize with a corresponding parent node of the new IAB node based on the corresponding T_delta; and
modify the network topology to include the new IAB node based on the first capability, the second capability, the third indication, or the fourth indication, or any combination thereof.

29. The apparatus of claim 24, wherein the at least one processor is further configured to receive an indication that the first IAB node supports an alternative synchronization source, and select one of the alternative synchronization source and the parent node of the first IAB node as a synchronization source for the first IAB node.

30. An apparatus for wireless communication, comprising:
a memory; and
at least one processor coupled to the memory and configured to:
transmit, from a first integrated access and backhaul (IAB) node to second node, a first indication, a second indication, or both, wherein
the first indication indicates a first capability of the first IAB node to provide a T_delta to a child node of the first IAB node,
the second indication indicates a second capability of the first IAB node to synchronize with a parent node of the first IAB node based on a T_delta received by the first IAB node, and
T_delta refers to a cell-specific component of a time difference between a distributed unit transmission of a signal from the first IAB node and a reception of the signal at the child node of the first IAB node;
determine a location of the first IAB node within a network topology based on the first capability and the second capability; and
synchronize the first IAB node with at least one of the parent node of the first IAB node or the child node of the first IAB node over-the-air based on the location of the first IAB node.

* * * * *